United States Patent
Saez et al.

(10) Patent No.: US 11,423,095 B2
(45) Date of Patent: Aug. 23, 2022

(54) PREDICTION-BASED ACTION-RECOMMENDATIONS IN A CLOUD SYSTEM

(71) Applicant: MICROSOFT TECHNOLOGY LICENSING, LLC, Redmond, WA (US)

(72) Inventors: William N. Saez, Kirkland, WA (US); Pramod Kumar Gupta, Redmond, WA (US); Sidhika Varshney, Seattle, WA (US); Jichen Yang, Walpole, MA (US); Joe A. Herzog, Seattle, WA (US); Michael M. Santos, Seattle, WA (US); Ransom L. Richardson, Acton, MA (US); Yimeng Li, Bellevue, WA (US); Yash Ravi Punjabi, Seattle, WA (US); Tejprakash S. Gill, Bellevue, WA (US); Tracy A. Childers, Seattle, WA (US); Siqing Chen, Bellevue, WA (US); Rui Hu, Redmond, WA (US); Jinnie Park, Bellevue, WA (US); Elijah John Scherrer, Seattle, WA (US); Raymond C. Li, Redmond, WA (US); Juan Antonio Karmy Tacla, Seattle, WA (US); Priya Tushar Nakhre, Seattle, WA (US); Anshul Basia, Haryana (IN); David Milićević, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/011,928

(22) Filed: Sep. 3, 2020

(65) Prior Publication Data
US 2022/0067106 A1   Mar. 3, 2022

(51) Int. Cl.
*G06F 16/93* (2019.01)
*G06F 9/50* (2006.01)
(Continued)

(52) U.S. Cl.
CPC ............ *G06F 16/93* (2019.01); *G06F 9/5072* (2013.01); *G06N 5/04* (2013.01); *H04L 67/22* (2013.01); *H04L 67/306* (2013.01)

(58) Field of Classification Search
CPC .................................................. H04L 67/306
See application file for complete search history.

(56) References Cited

U.S. PATENT DOCUMENTS 10,466,978 B1 * 11/2019 Vidan ..................... G06N 20/00
10,540,404 B1 *  1/2020 Dang ............ G06Q 10/063118
(Continued)

OTHER PUBLICATIONS

Chen, et al., "CollabSeer: A Search Engine for Collaboration Discovery", In Proceedings of the 11th annual international ACM/IEEE joint conference on Digital libraries, Jun. 13, 2011, 10 Pages.
(Continued)

*Primary Examiner* — Di Xiao
(74) *Attorney, Agent, or Firm* — NovoTechIP International PLLC

(57) ABSTRACT

Methods, systems, and computer storage media for providing action-recommendations (e.g., save action, collaboration action, and upload action) using cloud system operations in a cloud system. For example, action-recommendations are predicted using usage data of applications and communicated to a user (e.g., via a prompt) such that the user elects to perform or not perform the action-recommendation. In operation, usage data for an application and an action-recommendation profile are accessed. Determining that an action-recommendation should be generated is based on the usage data and the action-recommendation profile. The determination is further based on action scores and thresh-
(Continued)

olds (e.g., save action, collaboration action, upload action). When the action scores meet certain thresholds, the action-recommendation is generated as a save-action-recommendation, a collaboration-action-recommendation, or an upload-action-recommendation. Based on generating the action-recommendation, an action recommendation interface element (e.g., an action prompt or action dialog) is generated to perform a corresponding action.

17 Claims, 18 Drawing Sheets

(51) Int. Cl.
G06N 5/04 (2006.01)
H04L 67/306 (2022.01)
H04L 67/50 (2022.01)

(56) References Cited

U.S. PATENT DOCUMENTS

| | | | |
|---|---|---|---|
| 10,599,526 B2 | 3/2020 | Milvaney et al. | |
| 2005/0287502 A1* | 12/2005 | Southard | G16H 20/60 434/236 |
| 2010/0306668 A1* | 12/2010 | Williams, III | H04L 9/3226 715/741 |
| 2015/0138213 A1* | 5/2015 | Turner | G06F 3/0485 345/520 |
| 2017/0199789 A1 | 7/2017 | Milvaney et al. | |
| 2019/0354244 A1* | 11/2019 | Jayakumar | G06F 3/04817 |

OTHER PUBLICATIONS

Chuan, et al., "Link prediction in co-authorship networks based on hybrid content similarity metric", In Journal of Applied Intelligence, vol. 48, Dec. 5, 2017, 17 Pages.

Lee, et al., "Recommending Future Collaborators using Social Features and MeSH terms", In Proceedings of the American Society for Information Science and Technology vol. 48, Issue 1, Oct. 9, 2011. 9 Pages.

Shuvayan, Das, "Beginners Guide to learn about Content Based Recommender", Retrieved from: https://www.analyticsvidhya.com/blog/2015/08/beginners-guide-learn-content-based-recommender-systems/, Aug. 11, 2015, 35 Pages.

Night, Jack, "Overview of co-authoring in SharePoint Server", Retrieved from: https://docs.microsoft.com/en-us/sharepoint/governance/co-authoring-overview, Mar. 7, 2018, 6 Pages.

Yu, et al., "Predicting Co-Author Relationship in Medical Co-Authorship Networks", In Journal of Plos One, vol. 09, Issue 7, Jul. 3, 2014, pp. 1-7.

\* cited by examiner

PREDICTION-BASED ACTION-RECOMMENDATIONS IN A CLOUD SYSTEM

BACKGROUND

Users rely on cloud computing systems for developing content for different types of applications on client computing devices. A cloud system, such as a subscription-based cloud system, provides user productivity tools, features, and services on clients. For example, a cloud system provides a suite of applications and cloud-based service products for business environments. Conventional cloud systems are limited in their ability to provide cloud system operations. For example, a conventional cloud system can be native to cloud architecture; such systems are designed and improved primarily based on the cloud architecture. As such, conventional cloud systems are designed without consideration for additional factors associated with users and clients, or organization environments and tenant environments, which collaboratively interoperate with traditional non-cloud-based client software, server software, and services. As cloud systems continue to provide application and service functionality, improving cloud system operations can result in more effective and efficient cloud computing systems.

SUMMARY

Various aspects of the technology described herein are generally directed to systems, methods, and computer storage media, for among other things, providing action-recommendations (e.g., save action, collaboration action, and upload action) using cloud system operations in a cloud system. Actions can refer to application commands or more specifically commands that are directives for an application operating on a client or in combination with a cloud system to perform a computing task. For example, a command button can be a graphical control element that provides the user with a simple way to perform a computing task (e.g., saving a file, identifying collaborators for a file, and uploading a file to a cloud storage). In this way, an action-recommendation refers to an action that is recommended for a user to perform, where recommending the action is based on usage data (e.g., user usage data of applications and services associated with the cloud system). In particular, action-recommendations are predicted and communicated to a user (e.g., via a prompt) such that the user elects to perform or not perform the action-recommendation.

Operationally, the cloud system includes a cloud system engine (server-side and client-side) that processes action-recommendation models (i.e., a machine learning model or "ML" model used interchangeably herein) and action-recommendation profiles (e.g., computing objects representing users, clients, organizations, cloud-providers, and scores) to generate and communicate action-recommendations to clients. As discussed in more detail below, the action-recommendation models are trained machine learning models that access training data and additional data to predict different actions that could be performed. The training data and additional data (i.e., "structured action-recommendation data") can refer to action-recommendation profiles that are computing objects storing cloud system data that is associated with users, clients, organizations, cloud-providers, and scores.

The action-recommendation models and action-recommendation profiles can specifically support recommending hybrid cloud actions of the cloud system. Hybrid cloud actions include actions that are associated with traditional (e.g., desktop) productivity tools functionality and the actions are now duplicated, extended, or interoperate with cloud productivity tools functionality. The action-recommendation models and action-recommendation profiles are generated based on usage data (e.g., raw application and cloud system data) including structured action-recommendation data defined based on attributes (i.e., save attributes, collaboration attributes, and upload attributes) of cloud system computing objects. Based on the action-recommendation models and action-recommendation profiles, additional cloud system operations and interfaces associated with action-recommendations can be performed for save actions, collaboration actions, and upload actions.

In operation, usage data for an application is accessed. Determining that an action-recommendation should be generated is based on the usage data. An action-recommendation profile (i.e., computing objects users, clients, organizations, cloud-providers, and scores) generated from an action-recommendation model can also be accessed and used to make the determination. A determination that the action-recommendation should be generated is made. The determination can computationally be based on action scores (i.e., file usage score, collaborator user score, file upload score) and thresholds (i.e., file usage threshold score, collaborator user threshold score, file upload threshold score) for a particular action (e.g., save action, collaboration action, upload action). The action scores quantify calculations made using the action-recommendation profiles and the action-recommendation model. When an action score meets a threshold, the action-recommendation is generated, for example, as a save-action-recommendation, a collaboration-action-recommendation, or an upload-action-recommendation. Based on generating the action-recommendation, an action recommendation interface element (e.g., a prompt or dialog) associated with the action recommendation is generated to support performing the corresponding action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1A:
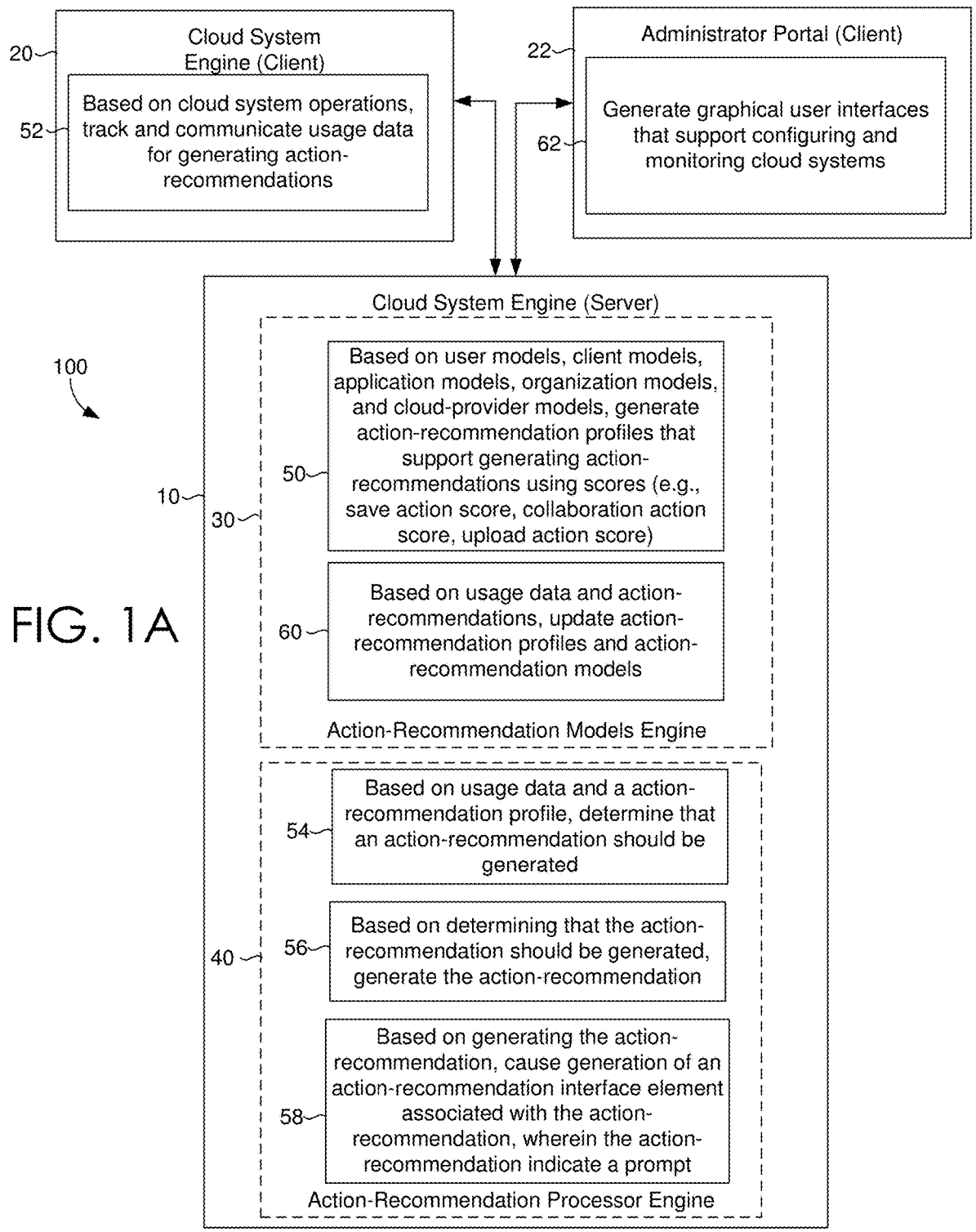
FIGS. 1A-1B are block diagrams of an exemplary environment for providing cloud system operations based on action-recommendation profiles in a cloud system, suitable for use in implementing aspects of the technology described herein.

Overview of Aspects of the Technological Improvement

Cloud systems or distributed computing systems can refer to systems that provide on-demand availability of computer system resources. Cloud systems can specifically provide computing system resources for developing content for different types of applications on client computing devices. For example, a cloud system provides a suite of applications and cloud-based service products for business environments. Cloud systems are association with clients and users (e.g., user base) of applications (e.g., mobile apps and desktop apps). Apps or client apps generally refer to software that is downloaded to a client or software that runs on a server (e.g., web application) that is accessed using a client. In this regard, apps can include client-deployed and server-side software and services (e.g., word processor, spreadsheet, and presentation apps) that operate as productivity tools.

Conventional cloud systems are limited in their ability to provide cloud system operations for hybrid cloud actions. Hybrid cloud actions include actions that are associated with traditional (e.g., desktop) productivity tools functionality and the actions are now duplicated, extended, or interoperate with cloud productivity tools functionality. By way of example, a conventional cloud system can be native to cloud architecture. Such systems are designed and improved primarily based on the cloud architecture without consideration for additional factors associated with users and clients, or organization environments and tenant environments that collaboratively interoperate with traditional (e.g., non-cloud based client software, server software, and services). For example, a traditional or local word processor, spreadsheet, or presentation application can be installed on a desktop computer and the same or complimentary applications can also be accessible through a cloud system (e.g., via a subscription service). Files or documents of these applications can be saved in local storage or cloud storage. Users often work dynamically between their desktop applications and cloud applications and may not pay attention to which version of the application is being used. Problems and challenges related to the interoperation between the different local and cloud versions of the application are unique in this shared context, especially with reference to hybrid cloud actions. In this regard, the shared functionality (e.g., save action, storage action, collaboration action) can be leveraged to address these problems and challenges.

Save Action

With reference to a collaboration action, conventional cloud applications support identifying users for collaboration with a document based on limited algorithms (e.g., most recent contacts and most frequently used contacts). Usage data has also shown that collaboration is not exclusively dependent on recent contacts or frequently used contacts. And, while local applications or cloud applications may identify collaborator users, identifying the collaborator users is conventionally dependent exclusively on the local application or exclusively on the cloud application, without consideration for intelligently combining usage data from both the local application and cloud application contexts. For example, a user's contacts from the local application may be different from the contacts from the cloud application, and usage data from each of these applications can be different. In this regard, usage data from a desktop word processing application can be combined with usage data from a professional or personal social network application to make different inferences and particular inferences for hybrid action recommendations. As such, the recommended collaborator users, that are already based on limited algorithms, can further be limited because comprehensive context of the user is not taken into account.

Collaboration Action

With reference to a collaboration action, conventional cloud applications support identifying users for collaboration with a document based on limited algorithms (e.g., most recent contacts and most frequently used contacts). Usage data has also shown that collaboration is not exclusively dependent on recent contacts or frequently used contacts. And, while local applications or cloud applications may identify collaborator users, identifying the collaborator users is conventionally dependent exclusively on the local application or exclusively on the cloud application, without consideration for intelligently combining usage data from both the local application and cloud application contexts. For example, a user's contacts from the local application may be different from the contacts from the cloud application, and usage data from each of these applications can be different. In this regard, usage data from a desktop word processing application can be combined with usage data from a professional or personal social network application to make different inferences and particular inferences for hybrid action recommendations. As such, the recommended collaborator users, that are already based on limited algorithms, can further be limited because of comprehensive context of the user is not taken into account.

Moreover, many users are unaware that modern authoring apps allow for coauthoring and collaboration in real-time. Often these users collaborate asynchronously by sending copies of the file back and forth. Even when some users are aware of coauthoring and collaboration functionalities, they must create a file before they can specify who to collaborate with. Such a workflow introduces friction because users sometimes choose a file location that does not allow for modern collaboration. As such, users need to be instructed to move or copy the file to a cloud location for modern collaboration.

Upload Action

With reference to upload action, conventional local applications and cloud applications support uploading files to the cloud. Usage data has shown that users retroactively save files to cloud storage. One reason for this is because users are accustomed to saving files to storage that is local to their machine. While this workflow may seem simple and familiar, saving files locally does not take advantage of the additional functionality available through cloud applications and cloud storage. For example, files saved to the cloud allow for access from different types of clients (e.g., desktop, mobile, and web). Without saving files to cloud storage users also cannot use real-time collaboration cloud functionality and safety of automatic saving and backup, amongst other cloud features.

As demonstrated, with reference specifically to save actions, collaboration actions, and upload actions, conventional cloud systems are limited in supporting computing operations for dynamic use and interoperation of local applications and cloud applications. Dynamically switching between local applications and cloud applications can raise challenges when it comes to saving, collaborating, and uploading files. Interoperation of functionality that is shared between a local application and a cloud application can further create unexpected limitations in the user experience when the functionality is inconsistent between the local applications and the cloud applications. Moreover whenever any friction exists in adopting features supported in a cloud application, users revert to behaviors associated with a corresponding local application. As such, a comprehensive cloud system with an alternative basis for executing cloud system operation can improve computing operations and interfaces that remove friction and redirect user behavior with reference to hybrid cloud actions in cloud systems.

Embodiments of the present invention are directed to simple and efficient methods, systems, and computer storage media for providing action-recommendations (e.g., save action, collaboration action, upload action) among other things, providing action-recommendations (e.g., save action, collaboration action, upload action) using cloud system operations in a cloud system. Actions can refer to application commands or more specifically commands that are directives for an application operating on a client or in combination with a cloud system to perform a computing task. For example, a command button can be a graphical control element that provides the user with a simple way to perform a computing task (e.g., saving a file, identifying collaborators for a file, and uploading a file to a cloud storage). In this way, an action-recommendation refers to an action that is recommended for a user to perform, where recommending the action is based on usage data (e.g., user usage data of applications and services associated with the cloud system. In particular, action-recommendations are predicted and communicated to a user (e.g., via a prompt) such that the user elects to perform or not perform the action-recommendation.

Operationally, the cloud system includes a cloud system engine (server-side and client-side) that processes action-recommendation models (i.e., a machine learning model or "ML" model used interchangeably herein) and action-recommendation profiles (e.g., computing objects representing users, clients, organizations, cloud-providers, and scores) to generate and communicate action-recommendations to clients. The action-recommendation models are trained machine learning models that access training data and additional data to predict different actions that could be performed. The training data and additional data (i.e., "structured action-recommendation data) can refer action-recommendation profiles that are computing objects storing cloud system data that is associated with users, clients, organizations, cloud-providers, and scores.

The action-recommendation models and action-recommendation profiles can specifically support recommending hybrid cloud actions of the cloud system. Hybrid cloud actions include actions that are associated with traditional (e.g., desktop) productivity tools functionality and the actions are now duplicated, extended, or interoperate with cloud productivity tools functionality. The action-recommendation models and action-recommendation profiles are generated based on usage data (e.g., raw application and cloud system data) and structured action-recommendation data for attributes of cloud system computing objects. Based on the action-recommendation models and action-recommendation profiles, additional cloud system operations and interfaces associated with action-recommendations can be performed for save actions, collaboration actions, and upload actions.

In operation, usage data for an application is accessed. Determining that an action-recommendation should be generated is based on the usage data. An action-recommendation profile (i.e., computing objects users, clients, organizations, cloud-providers, and scores) generated from an action-recommendation model can also be accessed and used to make the determination. A determination that the action-recommendation should be generated is made. The determination can computationally be based on action scores (i.e., file usage score, collaborator user score, file upload score) and thresholds (i.e., file usage threshold score, collaborator user threshold score, file upload threshold score) for a particular action (e.g., save action, collaboration action, upload action). The action scores quantify calculations made using the action-recommendation profiles and the action-recommendation model. When an action score meets a threshold (e.g., file usage threshold, collaborator user threshold, file upload threshold), the action-recommendation is generated, for example, as a save-action-recommendation, a collaboration-action-recommendation, or an upload-action-recommendation. Based on generating the action-recommendation, an action recommendation interface element (e.g., a prompt or dialog) associated with the action recommendation is generated to support performing the corresponding action. Aspects of the technical solution can be described by way of example operations and interfaces and with reference to FIG. 2A-2G (save action), 3A-3F (collaboration action) and 4A-4B (upload action).

Save Action

The save-action-recommendation is generated to assist users to save unsaved files. A save action refers to an application command to perform the task of saving a file or document (e.g., a save button that is a graphical control element or keystroke combination that provides a user a simple way to trigger a save file computing task). The save-action-recommendation refers to a recommendation for a user to trigger the save action. In particular, the save-action recommendation is generated when a determination has been made that enough investment (e.g., file meets a file usage threshold) has been made on the file and saving the file would prevent loss of data (e.g., a threshold amount of data loss associated with the file). For example, the determination of enough investment can be made based on generating a file usage score that is an action score that quantifies calculations made using usage data and machine learning models. The data loss can be associated with data directly added to the file or other data associated with the file (e.g., edit history and clipboard data). When users spend a long time adding changes to a new file without saving the changes on the application, the users risk losing their work if the application experiences an error or the application crashes while the user is editing the file. Although the cloud system may have features that support file recovery, it is not always possible to guarantee that files will be recovered.

At a high level, with cloud system operations described herein, when a user is working on a file (e.g., word processor, spreadsheet, and presentation document) the technical solution includes analyzing usage data (e.g., file usage data, file editing data) based on an action-recommendation model (i.e., a save-action-recommendation machine learning model). The action-recommendation model supports providing a save prompt (i.e., a save-action-recommendation). The usage data that is utilized as machine learning training data can include buttons and commands clicked on (i.e., click stream data), how much time a user spends on the file (i.e., dwell time), and how much content has been added to the file (i.e., updates). The file usage data is used to train the action-recommendation model for predicting when a user should smartly save a document.

The technical solution provides novel cloud system operations (e.g., file saving operations) that include detecting, based on an action-recommendation model, when certain conditions have occurred (e.g., file usage data—file editing data associated with file editing features—has exceed a threshold). Upon detecting that certain conditions have occurred, the cloud system operations can cause proactive generation of a prompt to save the file. In this way, the technical solution supports timely securing edits made on the file via an application, to avoid loss of edits in case of a crash of the application or user forgetting to save at the end of an editing session. The technical solution further includes a novel interface that includes a save recommendation dialog to allow the user to save or not save the file or perform additional actions. The technical solution can specifically operate with different cloud services, applications, and interface elements (e.g., email attachments, file editing features, and operating system features) in different contexts, when making recommendations to save the file. By way of illustration, if a user receives a file as an email attachment, and then the user opens the file, and starts editing the file, the user behavior data (i.e., usage data) in this email attachment file context can be utilized such that a prompt to save the file is provided based the email attachment file context. Specifically, because users often lose edits in this context, the prompt to save the file may be presented more quickly than in other contexts. In this regard, the usage data for each context can specifically inform the manner in which the save-action-recommendations in the corresponding context.

With reference to FIGS. 2A-2G, FIG. 2A and FIG. 2B are example user interface illustrations showing save prompt 210 with prompt text 212 and save button 214; close "X" 216 and save prompt 220 with prompt text 222 and save button 224. It is contemplated that the save prompts can be generated with a "Not now" button (not shown) that will dismiss the prompt. The "Not now" button can have the same functionality as the close "X" 216. Both options communicate corresponding positive reinforcement feedback and negative reinforcement feedback to improve the action-recommendation profiles and machine learning models support the functionality described herein. The cloud system operations support generating save prompts (i.e., save prompt 210 and save prompt 220) when it is determined that a threshold of usage data (e.g., file editing data) has been met for an unsaved file. The save prompt is then generated. If users click save (e.g., save button 214 or save button 224), then the cloud system operations support displaying a cloud save dialog.

Figure 2A:
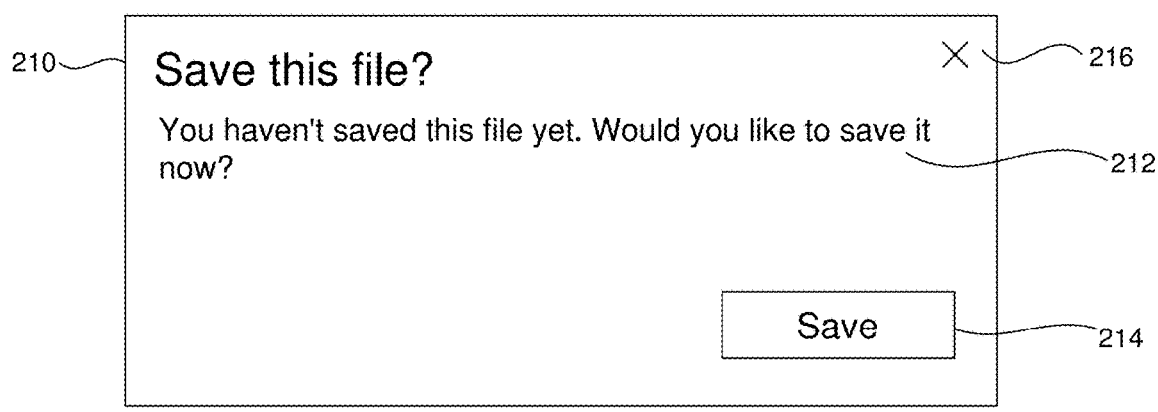
FIGS. 2A-2G are user interface illustrations and block diagrams for providing cloud system operations based on action-recommendation profiles in a cloud system, in accordance with aspects of the technology described herein.
Figure 2B:
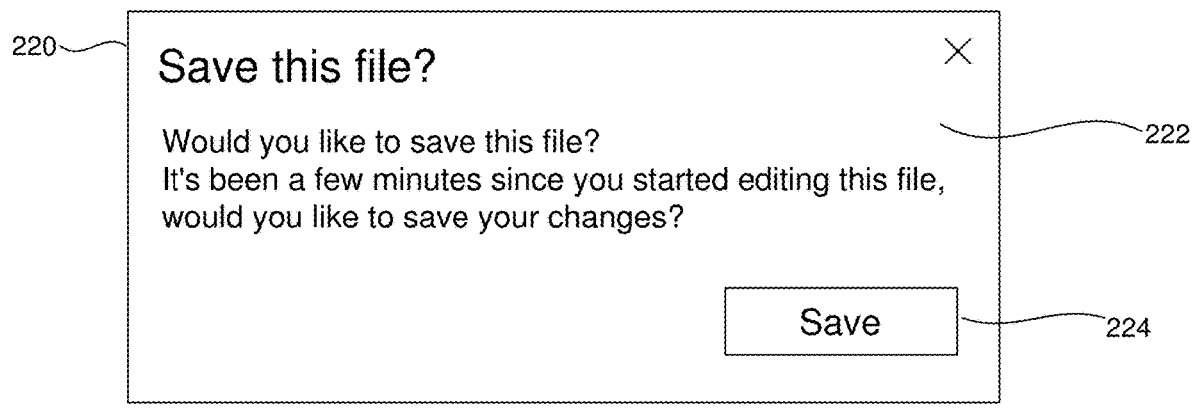
Figure 2C:
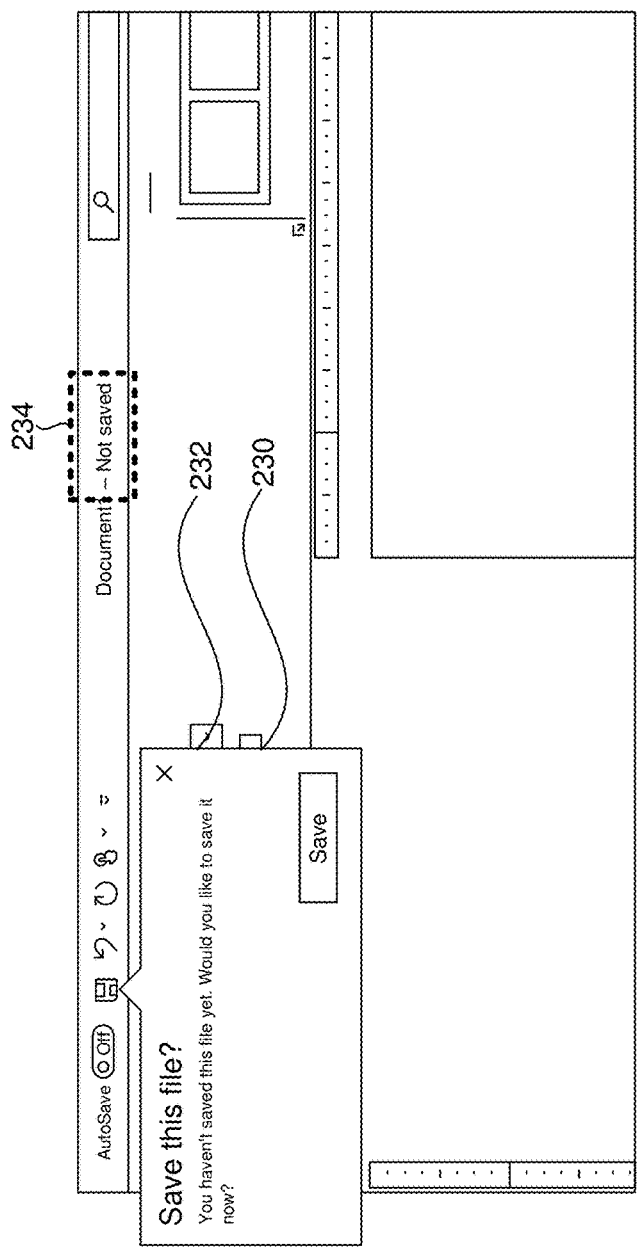
Figure 2D:
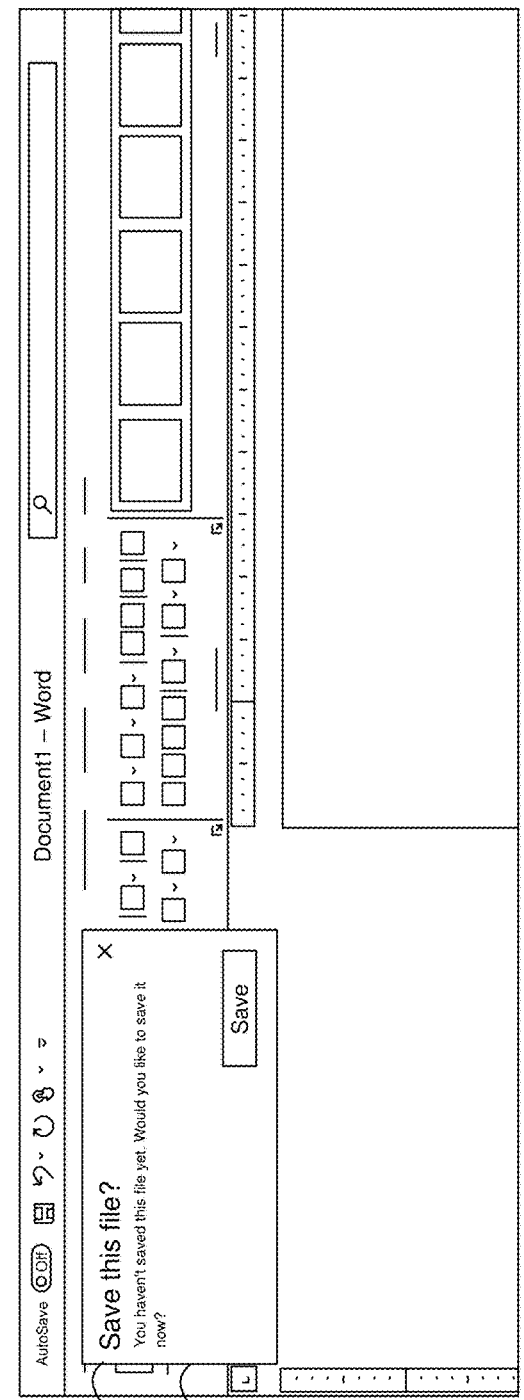

FIGS. 2C and 2D are example user interface illustrations showing a relative position of the save prompts generated for a word processor. In FIG. 2C, the save prompt 230 (with prompt text 232) is generated at a relatively left position of the word processor application. Specifically, the save prompt 230 can be anchored to the save button 236. A graphical user interface element "Not Saved" 234 can remain continuously displayed until the file has been saved. When additional edits are made to the document, the "Not Saved" graphical user interface can be displayed again. FIG. 2D, the save prompt 240 (with prompt text 242) is generated at a relatively upper left position of the word processor application interface. It is contemplated that other variations and combinations of generating the save prompts (i.e., save prompt 230 and save prompt 240) are contemplated with embodiments of this invention.

The cloud system operations can further determine that the client has no network connection and perform counteractive operations. For example, when users are online, signals are sent to the cloud system engine (e.g., service) where the machine learning is located. The signals are processed at the action-recommendation model. It is also possible that users lose connection or decide to work offline at any given point. For that reason, a version or copy of the action-recommendation model can be cached on the client to be used when users work offline. In operation, by way of example, upon start of the application, a most-recent version of the action-recommendation model can be downloaded to the client. In this way, the prediction-based action-recommendations can remain consistent even with a loss of network connection.

Figure 2E:
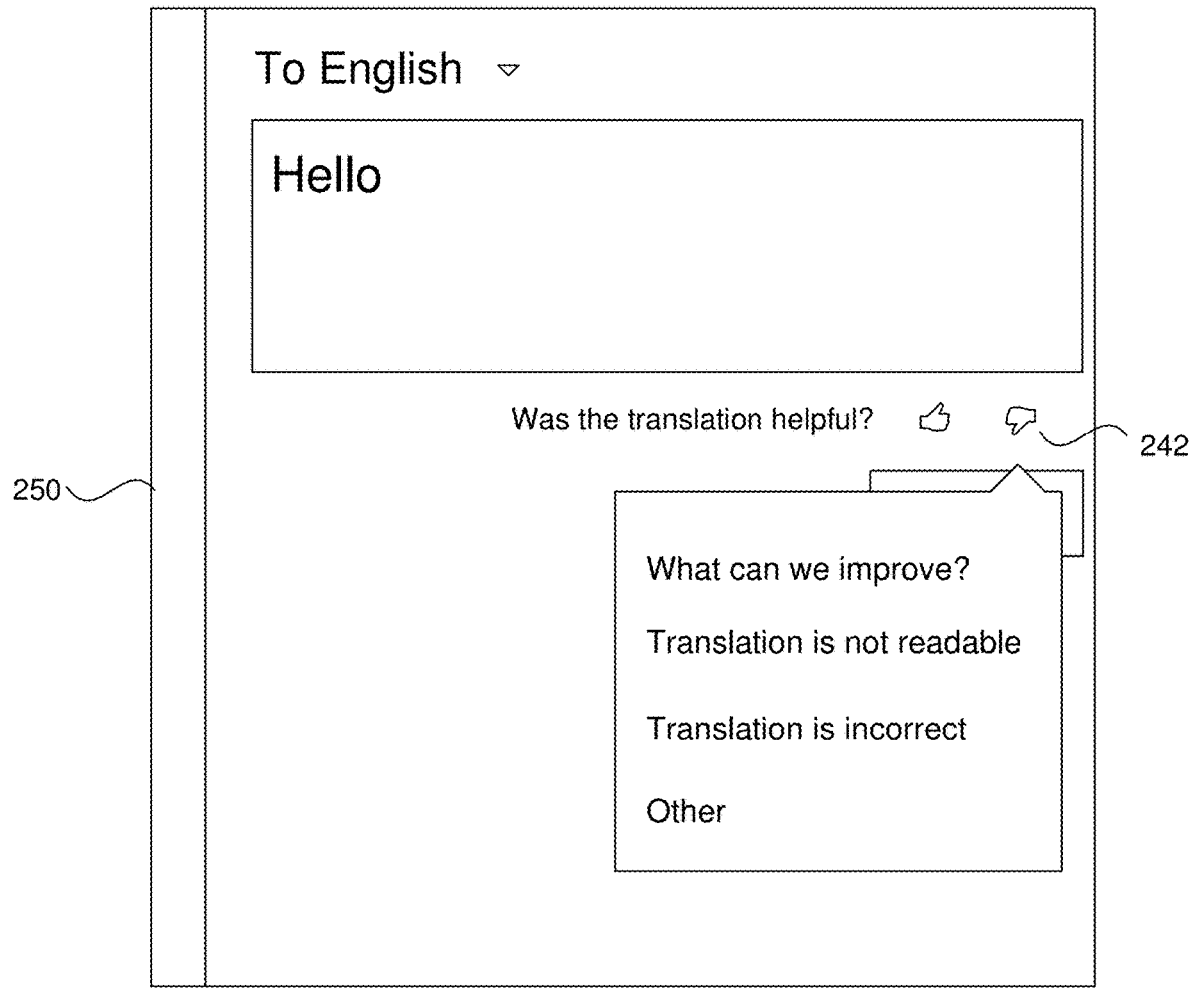

With reference to FIG. 2E, the cloud system operations can include generating a survey user interface (e.g., survey interface 250). The survey interface can be used to ask users for feedback. For example, the survey interface can be a floodgate survey interface that is triggered after a user input is received for the prompt. It is contemplated that if there are more specific questions that can be using the survey interface, Thumbs Up/Down graphic 242 can be a portion of the survey interface associated with specific questions. This provides users with a quick input to give feedback on whether they liked or not the Save Prompt, with the option of selecting a reason in case of dislike. In combination with usage data, feedback data, can be used to refine the action-recommendation model for appropriately predicting contexts when a user would likely want to save a file and make save-action-recommendation in those contexts.

Additional implementation details for the save-action-recommendation feature are provided below with reference to FIGS. 2F-2G. At a high level, a determination has to be made that a threshold amount of usage data (i.e., a file usage data) has been met by the user editing the file. For example, the cloud system operations, action-recommendation model and action-recommendation profiles can be used to track and analyze usage data to determine if the usage data meets a file usage threshold. In an example implementation, scoring models can be used, such that, a save action score (i.e., a file usage score) is calculated as a quantified value for how much the usage data indicates, based on the action-recommendation model, that a user should save a particular file or document. The file usage threshold score is compared to a file usage score threshold to make a determination whether or not to generate a save-action-recommendation. As such, when a save action score indicates that the usage data meets the file usage threshold, the action-recommendation is generated as a save action-action recommendation. As previously described, an action-recommendation interface associated with the action-recommendation is provided.

Usage data can be tracked and used to calculate the save action score based on signals from multiple sources. An action-recommendation model leverages a machine learning algorithm that, optionally, assigns weights to different signals. A greater weight indicates greater importance for predicting whether the user will save or not a file. The weights can further depend on the type of algorithm used. The importance of a particular signal be determined by removing the signal from the model and then recalculating the precision and recall. A significant change in either precision or recall indicates the signal is more important than other signal. The precision and recall of our model are tuned by adjusting a score threshold. Increasing this threshold increases our precision but decreases our recall. Lowering this threshold decreases our precision but increases our recall.

Signals can include clickstream (e.g. interaction with ribbon elements, menus, and buttons), telemetry (e.g., keyboard key presses, commands via keyboard shortcuts, time spent in a document, amount of content added), augmentation loop data (e.g. non personally identifiable queries, such as, is a file similar in structure to other files, is the location of the of the file a frequented location), or substrate data (e.g., people or team graph identifying and establishing relationships). Whether a save action score meets the file usage threshold can further be based on file editing features include: paragraph count; number of edits in a paragraph, edit update rate, whether the user has seen the save prompt, whether the user has dismissed the prompt, whether the user has saved via the prompt, and frequency of save versus discarding for the user.

Figure 2F:
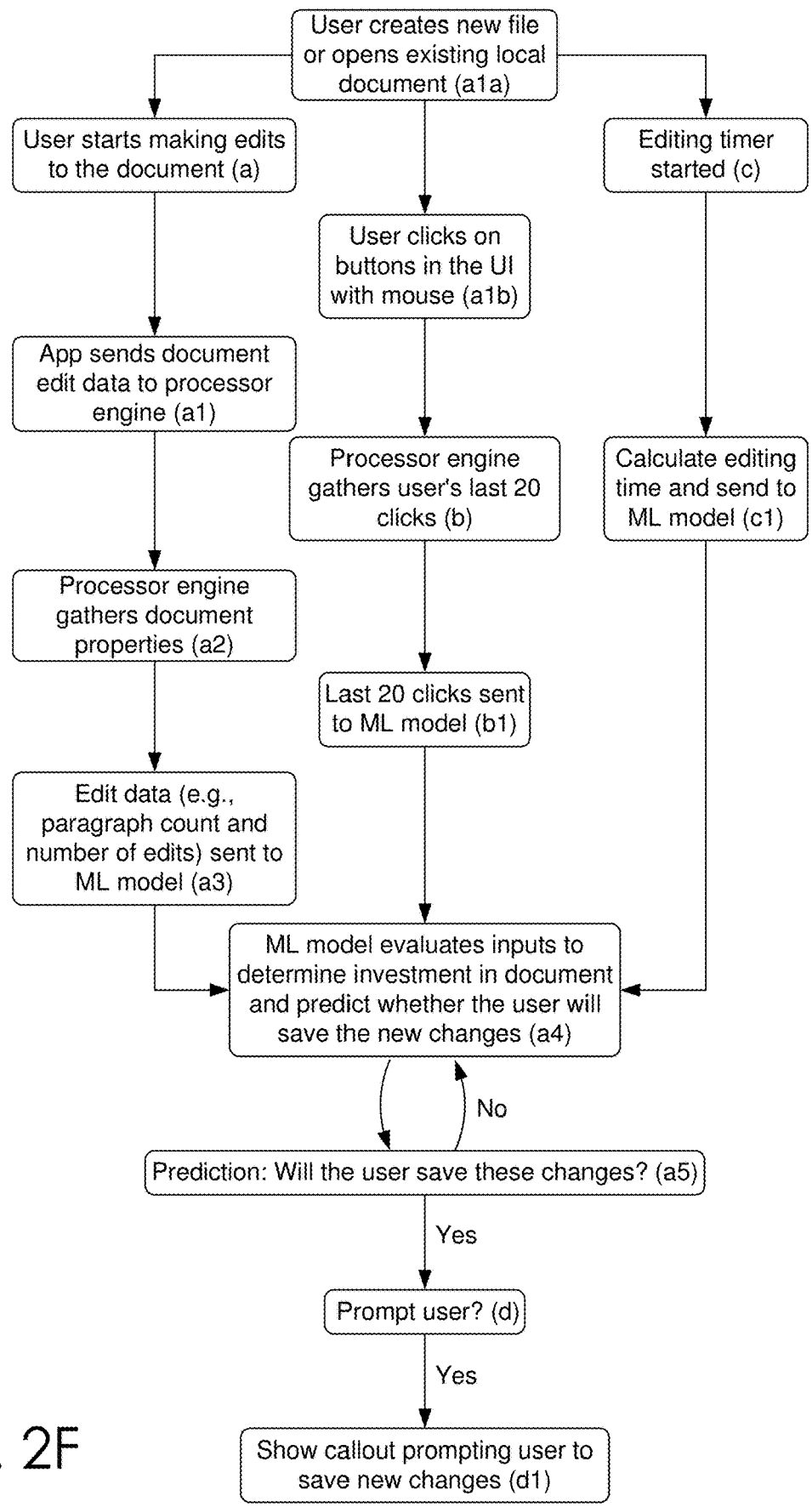
Figure 2G:
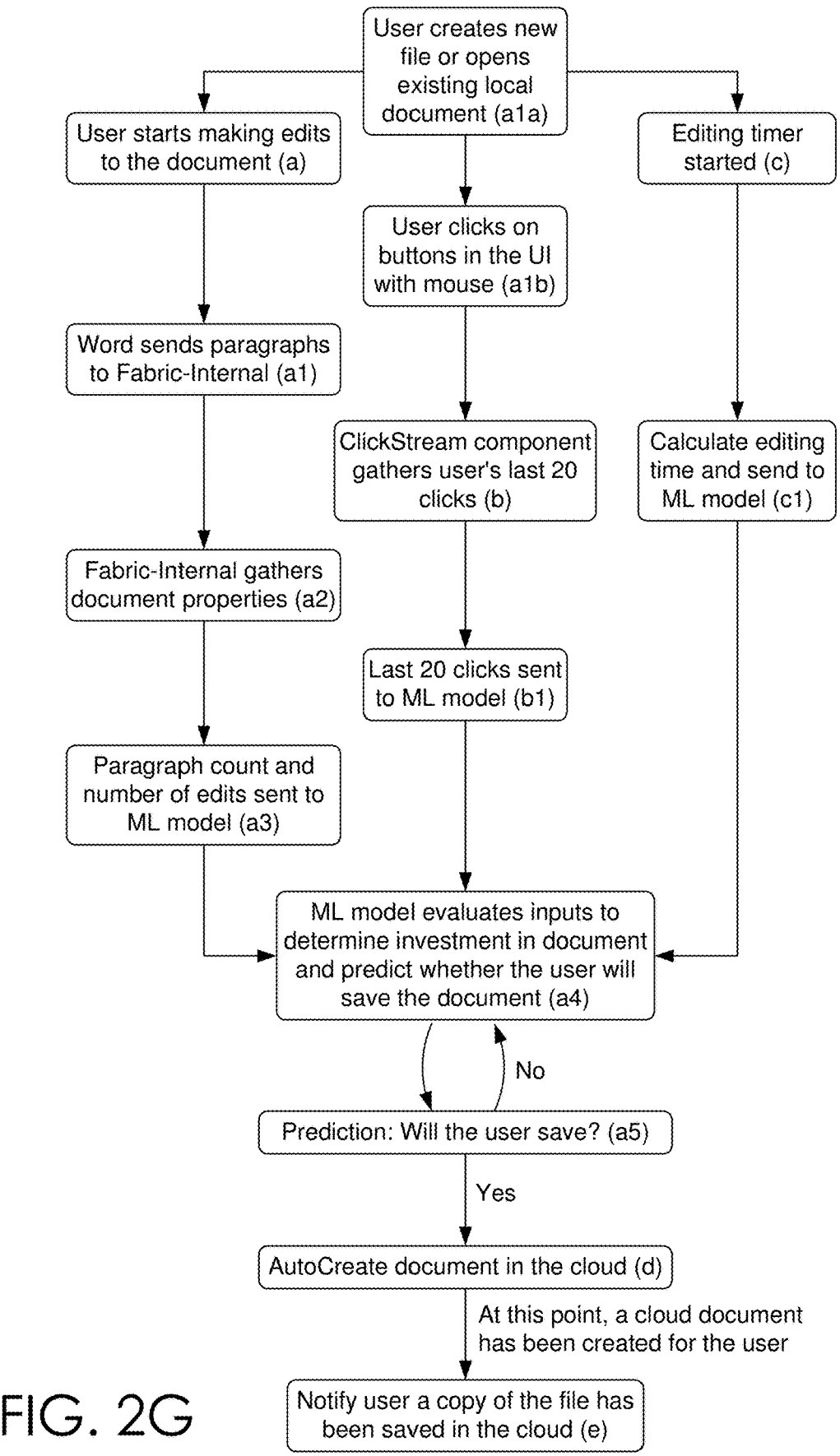

With reference to FIG. 2F, at step a1a, a user creates a new file or the user opens an existing local document. At step a, the user starts making edits to the document. At step a1, the application sends document edit data to the action-recommendation processor engine. At step a2, the processor engine gathers document edit properties. At step a3, the edit data (e.g., paragraph count and number of edits) are sent to the action-recommendation model. At step a1b, a user clicks on buttons in the UI with a mouse. At step b, the processor engine gathers user's last 20 clicks. At step b1, the last 20 clicks are sent to the action-recommendation model. At step c, an editing timer is started. At step c1, an editing time is calculated and sent to the action-recommendation model.

At step a4, the action-recommendation model evaluates inputs to determine investment in the document and predict whether the user will save the new changes. At step a5, if a determination is made that the user will save the changes, at step d a prompt to generated, and at step d1, a callout is presented to the user to save the new changes. If at step a5, a determination is made that the user will not save the changes, the action-recommendation model continues processing edit data (a3), user clicks (b1) and editing time (c1) until the determination is made to proceed. With reference to FIG. 2G, at step a5, if a determination is made that the user will save the changes, at step d, a document is automatically created in a cloud storage and at step e, a notification is sent to the user that a copy of the file been saved to the cloud storage.

It is further contemplated that different applications may also have application-specific signals such that the save action score is generated specifically based on usage data and editing feature for the specific application. For example, usage data for a word processing application can be based on a number of paragraphs, header/footer, table of contents, and ribbons; a presentation application can be based on number of slides, content added to tables, added titles, and added transitions; and spreadsheet application can be based on number of cells edited, text combined from cells, entered complicate formula, creating a macro project, sorting and filter. As such, the combination of usage signals, specifically per-application is unique and it determines the save action score relative to a file usage threshold and supports generating a save-action-recommendation for the user.

Collaboration Action

The collaboration-action-recommendation is generated to assist users to share a file (e.g., a document) with recommended users (i.e., collaborator users). A collaboration action refers to an application command to perform a task that includes one or more collaborator users (e.g., sharing a file or a document). The collaboration-action-recommendation refers to a recommendation for a user to select one or more of the collaborator users. In particular, the collaboration-action-recommendation (e.g., a "People Sharing/Sharing Suggestions" feature) aims to encourage users to start collaboration when a file is created. This has the additional benefit of having the user proactively involve any stakeholders and improve communication between collaborators in an organization. For example, a determination that one or more users can be a potential collaborator for a document can be made, based on generating a collaborator user score that is an action score that quantifies calculations made using usage data and machine learning models. Additionally, the technical solution operates to eliminate roadblocks that prevent users from adopting real-time collaboration features. For example, the cloud system operations can expose real-time collaboration features as an option during file creation. In this improved workflow, cloud system operations provide sharing suggestions which will use machine learning to match authors, documents, and collaborators in a way that makes it easy for users to invite others into their document at creation time. Moreover, the collaboration-action-recommendation is generated when a determination has been made based on usage data (e.g., collaboration attributes). For example, at a particular moment and for a particular document, the recommended collaborator users are other users that the user is likely to share the document with. When a user is working on a document and wants to share the document, the user often has to start reviewing their contact list or address book to selects other users to share to document. The collaboration attributes identified from the usage data in combination with machine learning can be used to make a determination of which collaborator user to recommend to the user. Although conventional systems may identify other users (e.g., most recent contacts), it is possible to more intelligently identify the other users to improve the user experience.

At a high level, with cloud system operations described herein, when a user creates a new file or document (e.g., word processor, spreadsheet, or presentation program) the technical solution includes analyzing collaboration attributes that include file features, user features, file context, file context and file creation data. The collaboration attributes are analyzed using the action-recommendation model to provide one or more suggested collaborators (i.e., a collaboration-action-recommendation). In particular, the technical solution provides a novel interface UI element (e.g., "Choose Collaborators" UI element) that will be generated. For example, the UI element can be provided with a listing of suggested recipients for a file. The suggested recipients can be ranked in order from highest to lowest confidence. The technical solution also includes feedback mechanism (i.e., a feedback engine) such that selection of a particular suggested recipient sends positive reinforcement feedback data to the action-recommendation model and omitting other collaborators results in sending negative reinforcement feedback data to the action-recommendation model.

With reference to FIGS. 3A-3D, FIGS. 3A and 3B are example user interface illustrations showing "share with prompt" 310 and "choose collaborators field" 320. In particular, when a user invokes a dialog used to save a file, the cloud system operations can access usage data (e.g., document and author attributes) to process the usage data using an action-recommendation model that will identify collaborators (e.g., Charlie 312A, Alice 312B, Dan 312C, and Sharon 312D) via the share with prompt 310 for the user to invite. In addition, when a user focuses on the choose collaborators field 320, the cloud system operations can also identify collaborators using usage data and an action-recommendation model, such that, the suggested collaborators (e.g., suggested recipients) are displayed in a ranked order from highest to lowest confidence. It is contemplated that choosing some collaborators will send positive reinforcement feedback to improve the action-recommendation model while omitting other collaborators will send negative reinforcement feedback.

Figure 3B:
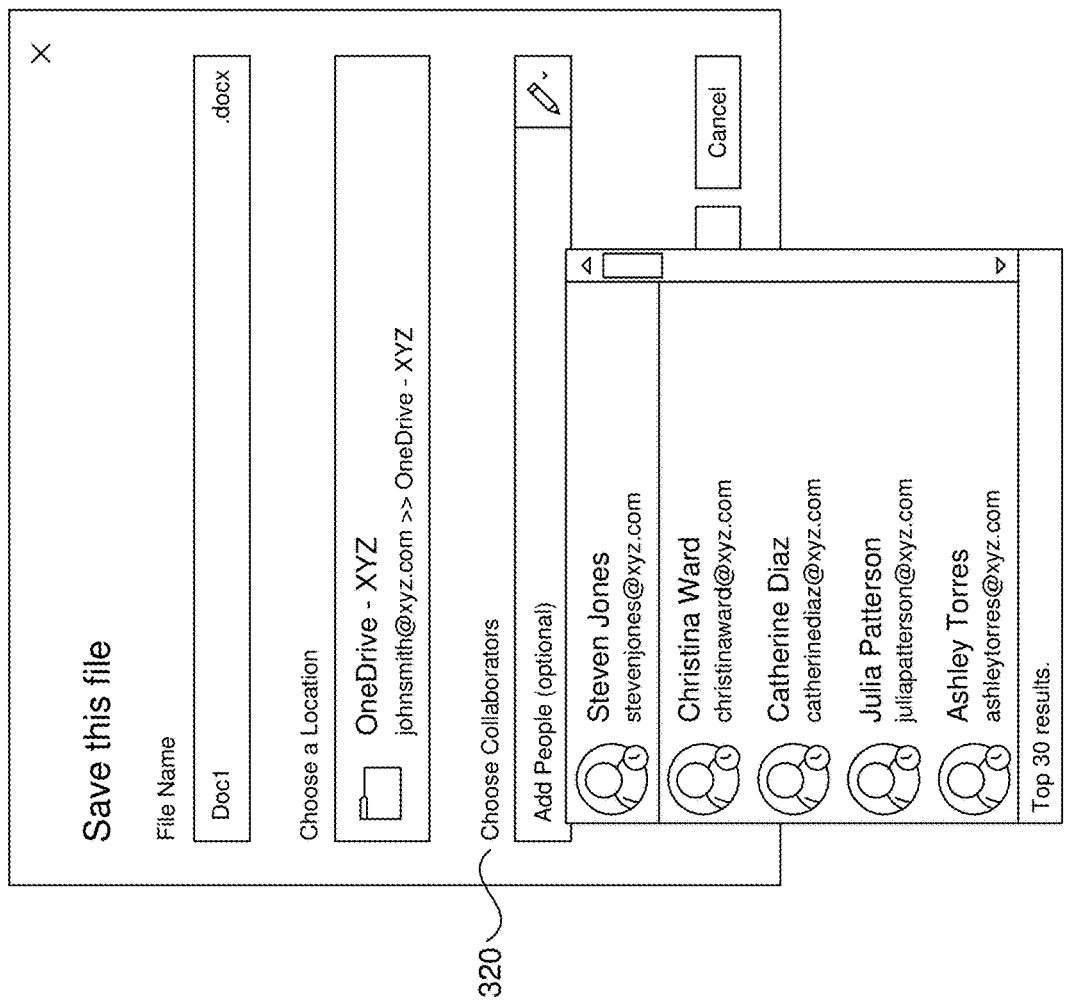
FIGS. 3A-3F are user interface illustrations and block diagrams for providing cloud system operations based on action-recommendation profiles in a cloud system, in accordance with aspects of the technology described herein.
Figure 3A:
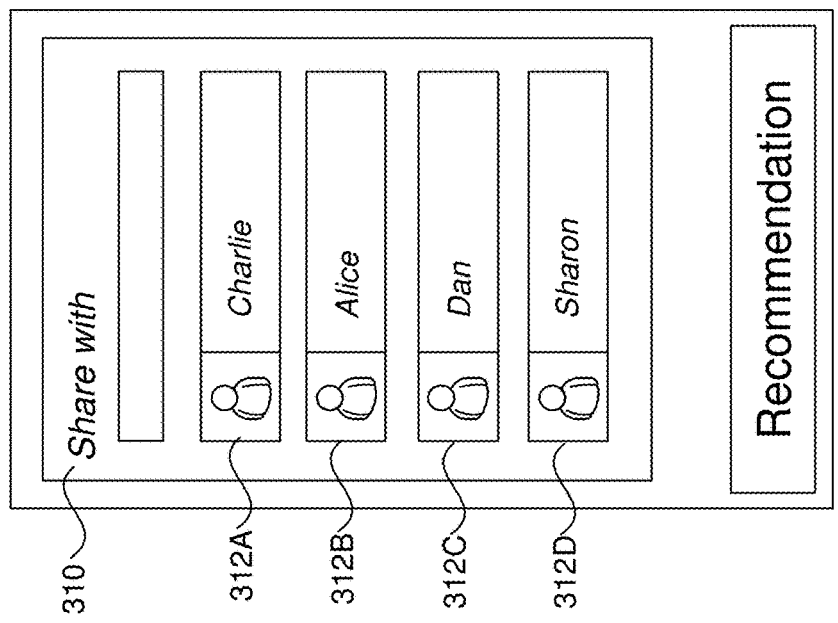
Figure 3C:
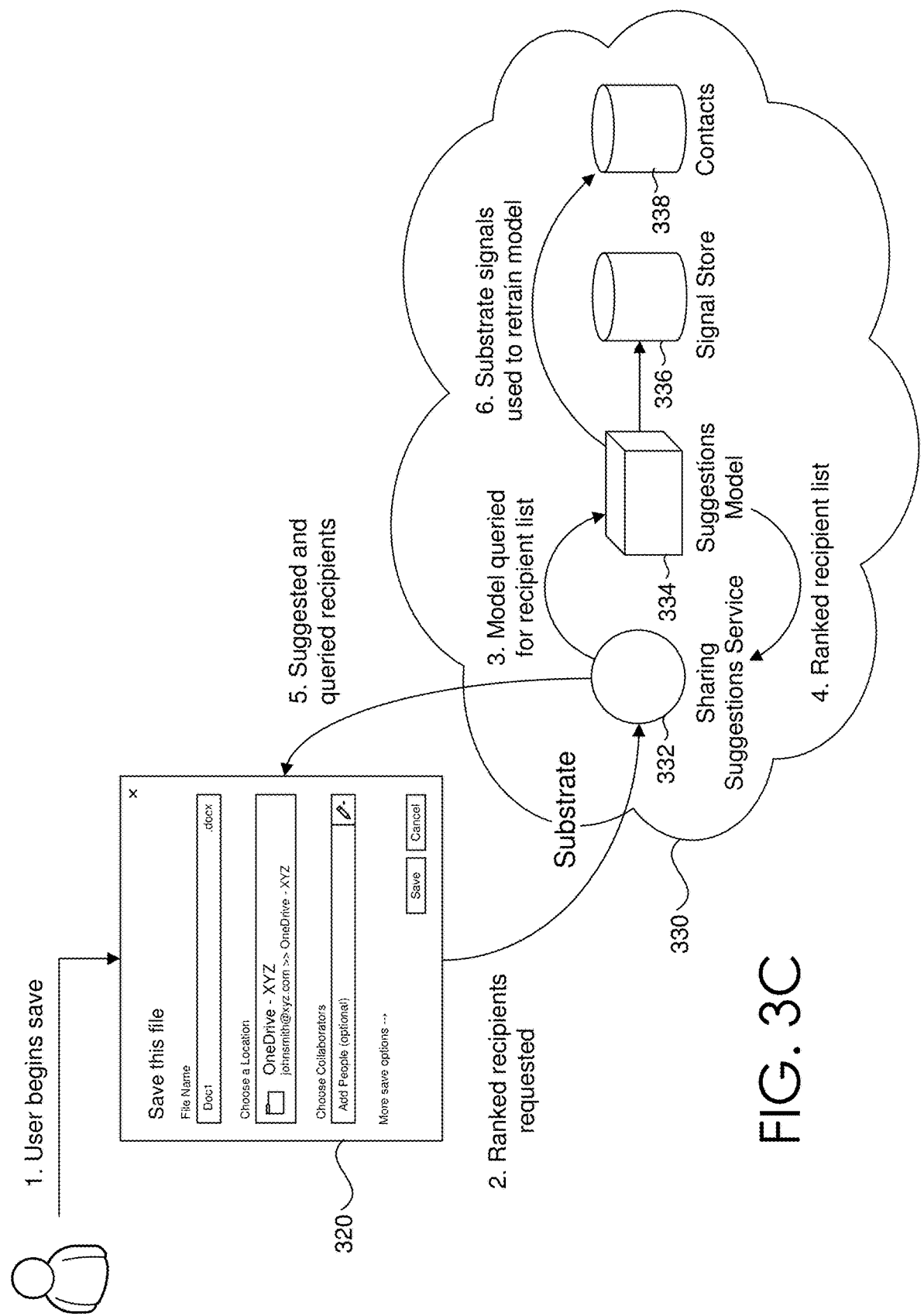

With reference to FIG. 3C, a substrate 330 (having a sharing suggestion server 332, a suggestions model 334, a signal store 336, and contacts 338) that supports the functionality described herein. As discussed, at step 1, the user begins to save a file that generates a dialog. Based on invoking the dialog used to save the file, at step 2, ranked recipients (i.e., collaborators) are requested. Requesting the ranked recipients is based on accessing a sharing suggestion service 332 that at step 3 queries the suggestions model 334 for a list of ranked recipients. At step 4, the suggestions model 334 generates and communicates a ranked recipient list based on the signal store 336 and the contacts 338. Operationally, signals can be derived from multiple sources (e.g., user interface (UI) or document). By way of example, UI signals (i.e., usage data) can include users that identified or seen, selected, kept, and shared with; index position of selected recipients (UI); and document signals can include whether a file was accessed, modified, downloaded, or uploaded, comments added to files by other user; documents shared with the user or author. The suggestions model 334 (i.e., collaboration action-recommendation machine learning model 334) can be built on several core questions that help identify collaboration users. For example, who are the people that will read my content? Who are the people that might comment? Who are the people that will edit? The suggestions model 334 can also be built on privacy considerations, as such, the machine learning process can be based on a privacy an eyes-off mode.

At step 5, suggested and queried recipients are communicated to using the choose collaborators prompt. The user can select from the suggested recipients and also search directories and manually add recipients. At step 6, it is contemplated that some of the signals will be used to improve the action-recommendation model. The user interface is further configured to send feedback to the sharing suggestions service 332 when the user completes the save, where the feedback identifies which recipients the user shared the document with. These feedback signals are used to retrain and improve the model, changing future rankings for the user's suggestions. In this regard, the cloud system operations support providing collaboration-action-recommendation using a unique combination of intrinsic document signals, past in-document collaboration signals, out-of-document person to person activity. Collaboration data (i.e., usage data) at a time of creation of a file can further suggest recipients based on past signals and current-document signals. The action-recommendation model is created using signals as listed above. Additional implementation details for the collaboration-action-recommendation feature are provided below.

Figure 3D:
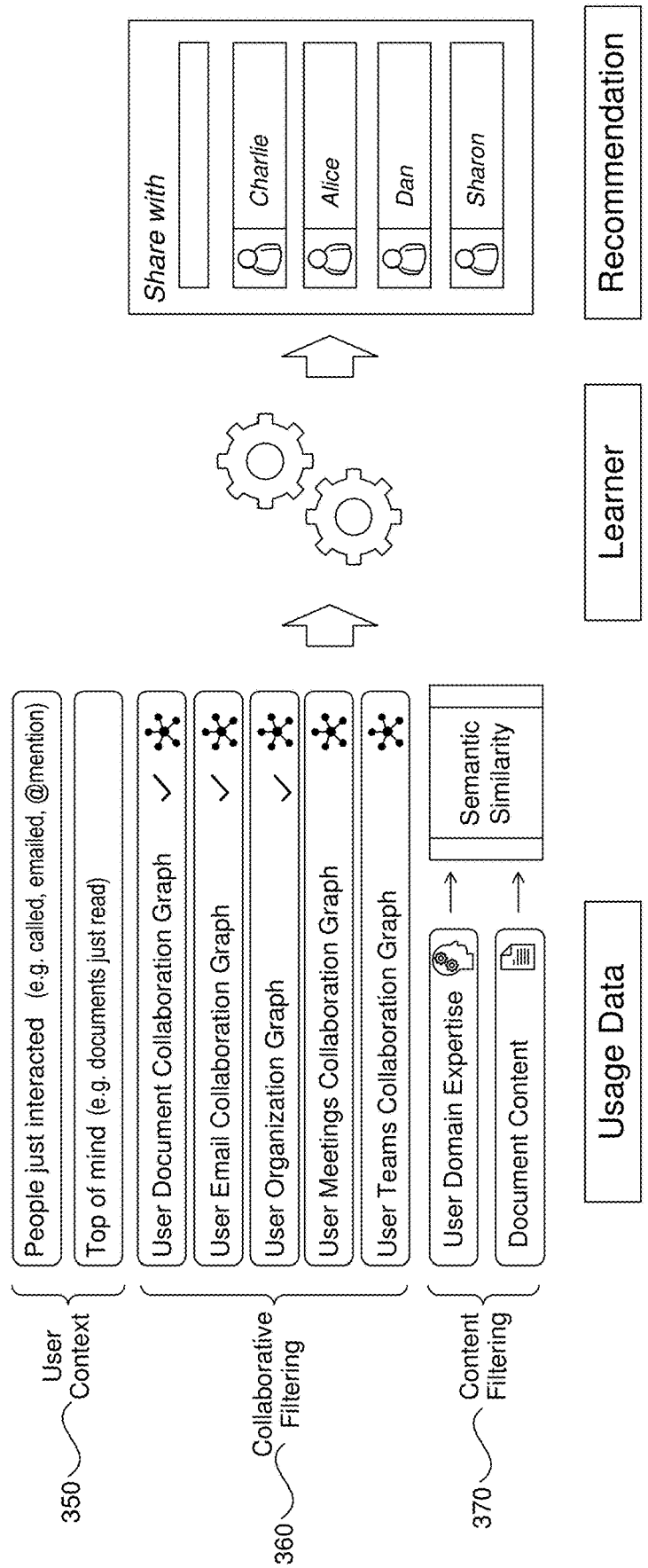

With reference to FIG. 3D, FIG. 3D includes three categories of collaboration attributes identifiable from usage data (i.e., user context 350, collaborative filtering 360, and content filtering 370). The suggestions model 334 is built to evaluate the instantaneous usage data so it leverages more contextual information. For example, the same document could be shared with different collaborators based on changing usage data. It is further contemplated that the suggestions model 334 can support a number of near real time features that capture the contextual information. The suggestions model 334 is also built on organizational hierarchy data as attributes into the model. For example, A (a first user) is the manager of B (a second user) or a C (an org or group) typically shares with n people. Additional signals include: users with D title (a first tier title) that typically share to users with title E (a second tier title); Users in Y geographic region (a second geographic region) never share to users in Z geographic region (a second geographic region). Other variations and combination of usage features are contemplated with embodiment described herein.

Additional implementation details for the collaboration-action-recommendation feature are provided below with reference to FIG. 3E. At a high level, a determination has to be made that a threshold amount of usage data has been met by a file. For example, the cloud system operations, action-recommendation model and action-recommendation profiles can be used to track and analyze usage data to determine if the usage data meets a collaborator user score. In an example implementation, scoring models can be used, such that, an action score (i.e., collaborator user score) is calculated as a quantified value for how much the usage data (i.e., collaboration attributes of usage data) indicates, based on the action-recommendation model, that a user should be a collaborator user for a file or document. The collaborator user score threshold is compared to the collaborator user score to make a determination whether or not to generate the collaboration-action-recommendation including the collaborator user. As such, when a collaborator user score indicates that the usage data meets the collaborator user threshold, the action-recommendation is generated as a collaboration-action-recommendation having one or more collaborator users. As previously described, an action-recommendation interface associated with the action-recommendation is provided.

It is contemplated that different types of signals (e.g., SIGS 340) can be used with reference to generating collaborator users. Signals can be received from several different applications (e.g., email application, productivity application, and application tools). As such, signal can be application-specific in that the signals are defined based on the type of application from which the signal is retrieved from. The signals support generating a collaboration action (e.g., GET /People?OrderBy='Relevance') that identifies a list of recommended collaborator users for a user (e.g., user 302) using an application (e.g., app 350). In operation, the functionality described herein can separated into asynchronous processing of signals (e.g., async 360), machine learning process (e.g., machine learning 370), and real-time processing (e.g., real-time 380) of usage data of app 350.

With reference to async 360, asynchronous processing can include feature engine 362 and processor 362. As an initial matter, with reference to feature engineering 362 and FIG. 3F, feature engineering can include steps for identifying features that are input data into the asynchronous processing. Feature engineering can include accessing signals (e.g., SIGS 340) and a user organizational database (e.g., User DB 304). At a high level, a set of features can be associated with a user-document-neighbor triplet to support identifying a feature set used for identifying collaboration users. In operation, at step 1, for each user, a set of documents that were recently created are identified. Example signals that are used to identify the set of documents include FileUploaded, FileModified, CommentAdded, FileDownloaded, and FileAccessd. At step 2, for each user, a set of neighbors that the user recently collaborated with are identified. These neighbors are identified as candidates for collaborator users. Example signals that are used to identify the set of neighbors include EmailSent, EmailViewed, and Attachment Opened. The feature set that is generated can specifically model the relationship between two users based on the above-identified signals and corresponding documents.

At step 3, the user DB 304 is accessed to cause generation of the feature-engineering model (e.g., a people relationship model) based on a plurality of user, documents, and neighbors (i.e., a user-doc-neighbor triplet). At step 4, each entry in the feature-engineering model is label based on a predefined label scheme. For example, the labels can include 4 (Perfect), 3 (Good), 2 (Fair), 1 (Poor), and 0 (Irrelevant) corresponding to (4) If a neighbor opened the document within a day; (3) If a neighbor open the document within 1-3 days; (2) If a neighbor opened the document within 3 and 7 days; (1) If a neighbor open the document within 7 and 15 days; and (0) If the neighbor did not look at the document. As discussed, in more detail below, feature engineering supports generating and revising a feature set that can be used for identifying collaborator users for a particular user.

Figure 3E:
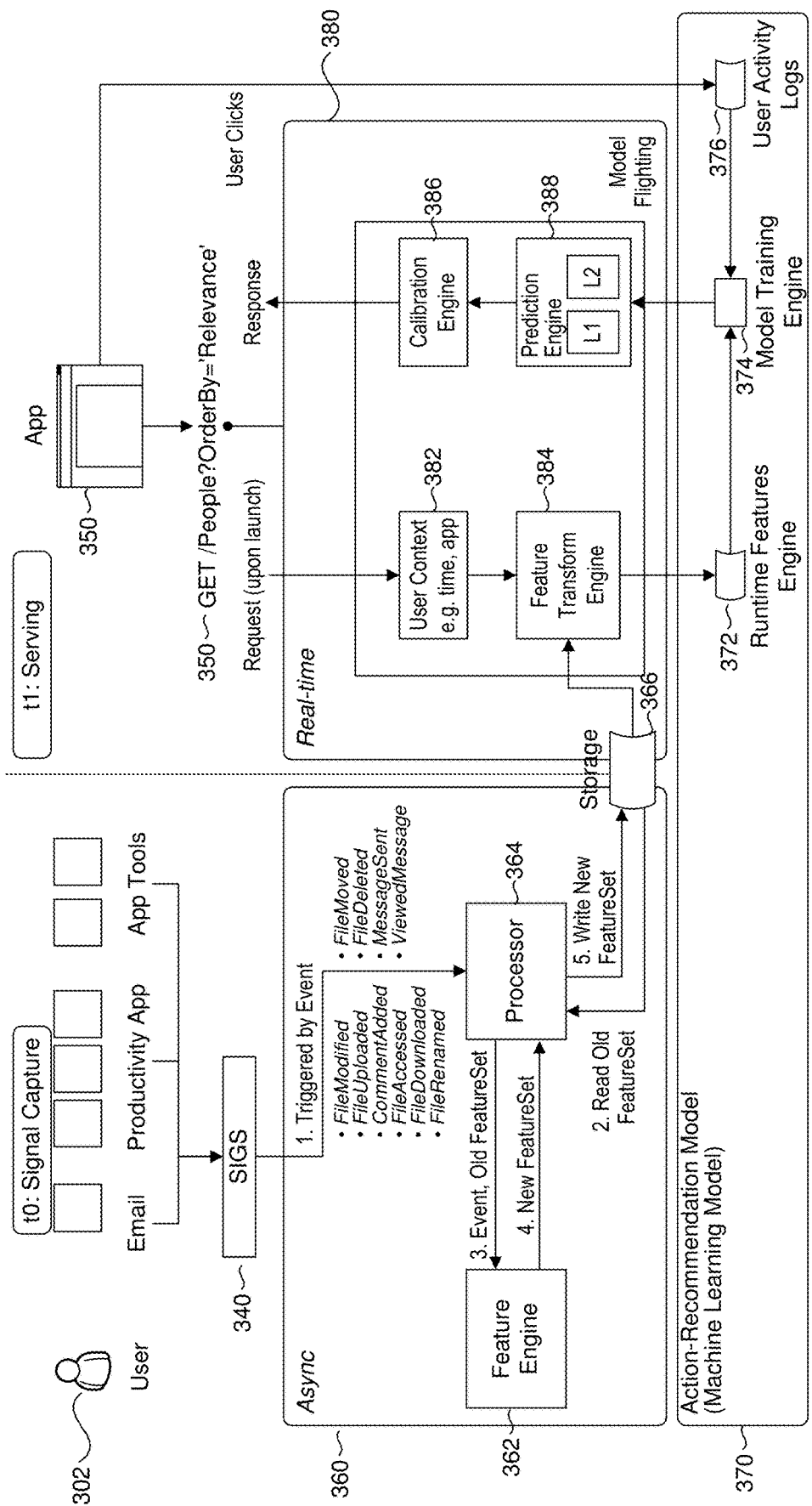
Figure 3F:
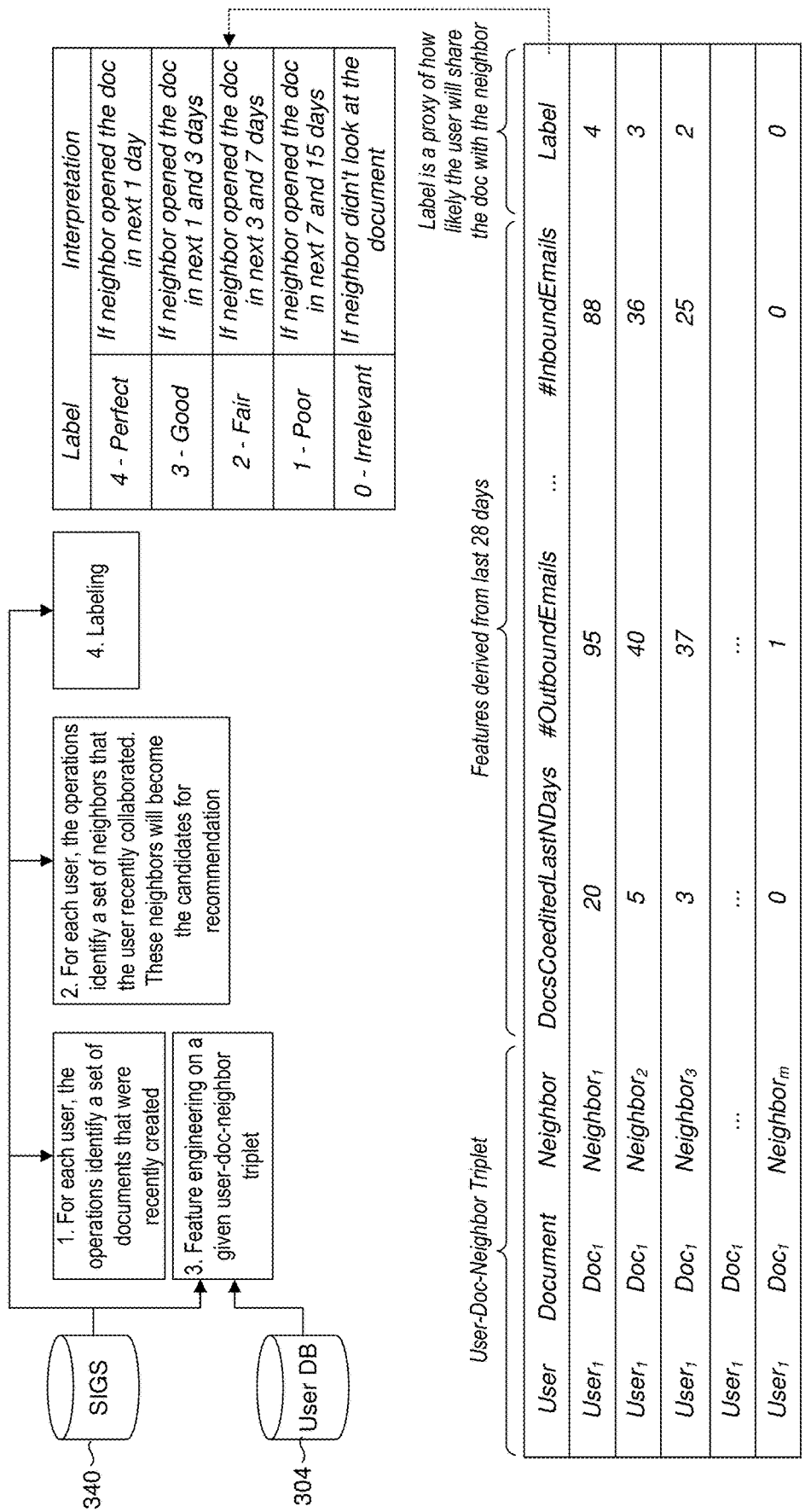
Figure 4A:
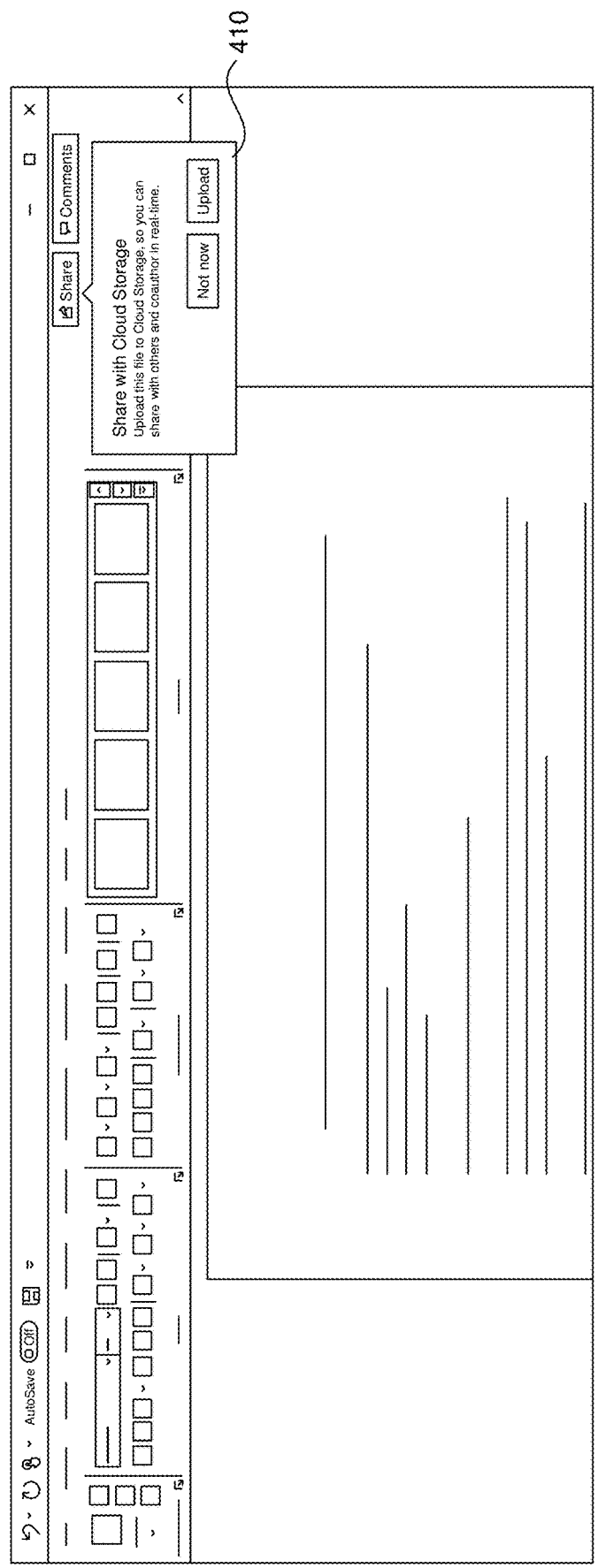
FIGS. 4A-4B are user interface illustrations and block diagrams for providing cloud system operations based on action-recommendation profiles in a cloud system, in accordance with aspects of the technology described herein.
Figure 4B:
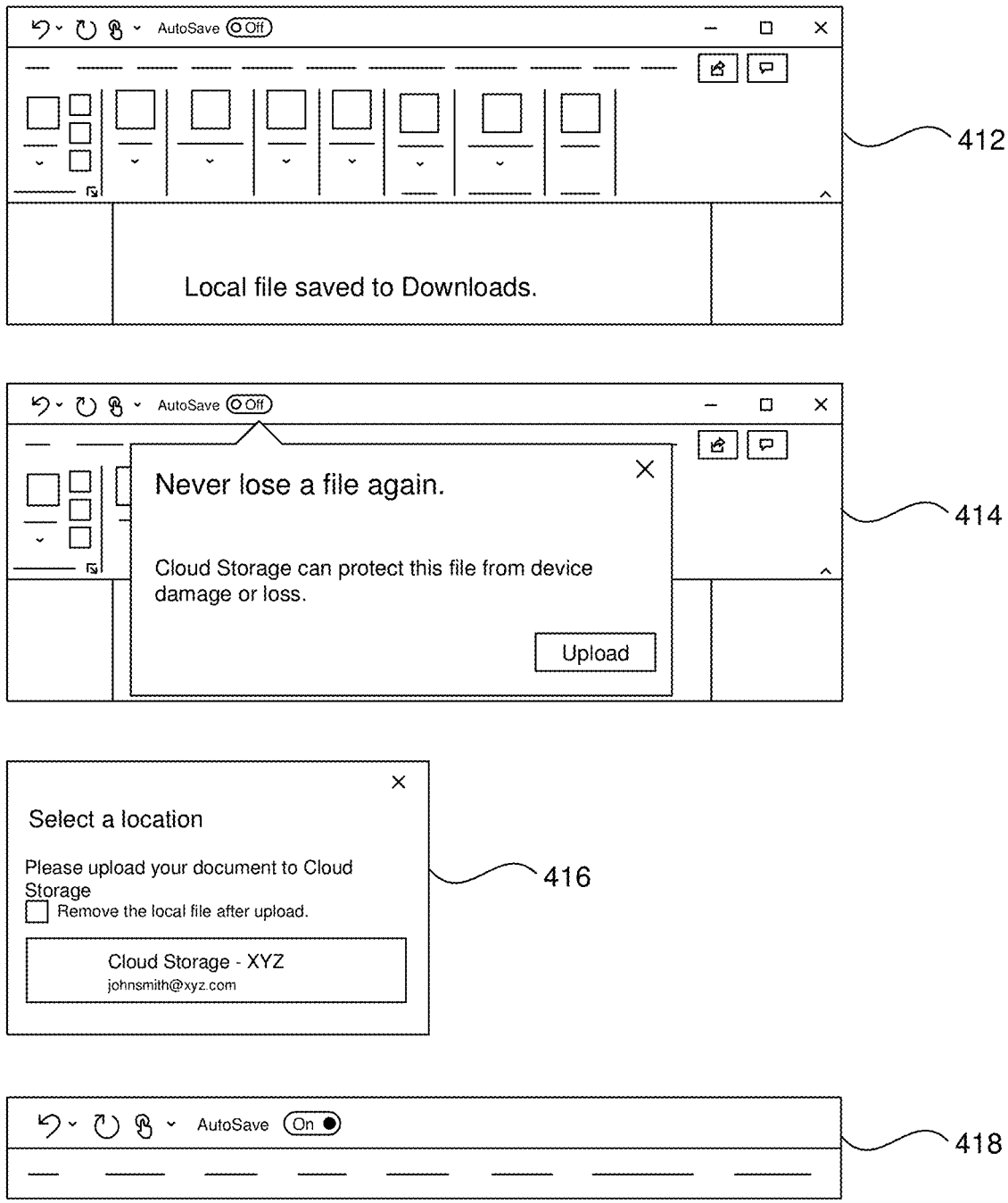

Turning to FIG. 3E, in operation, at step 1, a trigger event is identified. The triggering event can include any of the following FileModified; FileUploaded; CommentAdded; FileAccessed; FileDownloaded; FileRenamed; FileMoved; FileDeleted; MessageSent; and ViewedMessag. At step 2, an old feature set is read from storage (e.g., storage 366) using a processor (e.g., processor 364). The event and the old feature set are communicated for feature engineering (e.g. feature engine 362). Based upon feature engineering as discussed above, at step 4, a new feature set is communicated (via the processor 364) and written to storage 366.

Real-time processing components (e.g., user context 382, feature transform 384, calibration engine 386, and prediction engine 388) operate with machine learning processing components (e.g., runtime feature engine 372 model training engine, and user activity logs 376). In operation, after app 350 is launched, the user context can be processed in the feature transform engine to correspond to the feature set. For example, signals from the application are transformed to facilitate processing the user context relative to the feature set retrieved from storage 366. The runtime features engine is responsible for retrieving the feature set and user context via the feature transform engine 384. The runtime features engine 372 communicates runtime features (e.g., features used for generating a collaboration user score) to the model training engine 374. The model training engine also receive user activity logs 376 (e.g., user clicks from app 350).

One or more models are trained based on runtime engine features 372 and user activity logs 376. Trained machined learning models (e.g., via machine model fighting) are operable with the prediction engine 388. The prediction engine 388 support performing the cloud system operations for generating action-recommendations in real-time as described herein. It is contemplated that action-recommendation model that is used in the prediction engine 388 in the current embodiment. The prediction engine 388 may further operate with a calibration engine 386. The calibration engine 386 operates to compares actual output from the prediction engine 388 to expected output. The calibration engine 386 ensure the accuracy of the action-recommendations allowing for adjustment of the action-recommendation model based on the actual output and an expected output that is based on a defined standard from previously identified output. In operation, when a user invokes a dialog used to perform an action for a file, the cloud system operations can access usage data having collaboration attributes to process the usage data using an action-recommendation model that will identify collaborators via the share with prompt for the user to invite. In this way, the user the action-recommendation can predict one or more collaborator users for the file.

Upload Action

The upload-action-recommendation is generated to assist users to upload files to cloud storage. An upload action refers to an application command to perform the task of uploading a file or document to a cloud storage. The upload-action-recommendation refers to a recommendation for a user to trigger the upload action. In particular, the upload-action-recommendation is generated when a determination has been made based on user-document pair (e.g., user-document pair context data meets a threshold upload attributes). For example, the determination that a file is a candidate to be uploaded to the cloud storage can be made based on generating a file upload score that is an action score that quantifies calculations made using usage data and machine learning. Advantageously, this helps user proactively save file to cloud storage. Without saving files to cloud storage users also cannot use real-time collaboration cloud functionality and safety of automatic saving and backup, amongst other cloud features.

At a high level, with cloud systems operations described herein, when a user is working on a file or document (e.g., word processor, spreadsheet, or presentation document) the technical solution includes analyzing file user-document pair data based on an action-recommendation model to provide a recommendation on whether the file should be uploaded to the cloud. By way of context, an action-recommendation model can be generated based on offline data. The action-recommendation model is generated based on upload attributes of usage data that can help the action-recommendation model predict when certain files should be uploaded to a cloud store. For example, a user opens an email and opens an attached file, the action-recommendation model can analyze the file and based on upload attributes of the usage data to make a recommendation to the user to save the file to a cloud store.

In this regard, the technical solutions provides novel file upload operations that includes detecting upload attributes so that based on the action-recommendation model the user can proactively receive a prompt to upload the file to the cloud store. In this way, the technical solution can identify files that have a high probability of being saved to a cloud store and provide timely recommendations to proactively and securely save the files to the cloud store. The technical solution can specifically operate with different cloud services and applications (e.g., email attachment, editing, and operating system) in different contexts when making recommendations to upload the file.

The technical solution provides novel cloud system operation (e.g., file upload operations) that include detecting when certain conditions have occurred (e.g., user-document pair data based on usage data), so that, based an action-recommendation model, the user can proactively receive a prompt to upload a file. For example, when users open a locally stored file an application can first use an Application Programming Interface (API) hosting a logic specific to that application to quickly determine whether any vetoes are present. Vetoes are based on non-pattern logic to indicate if a file should not be uploaded to the cloud. Vetoes support preventing scenarios where cloud-incompatible features in a document are lost on upload.

Upon determining the document to be veto-free the document session is examined by the action-recommendation model to provide a prompt or no-prompt decision. If the document is determined to be a good match for prompting, the user is shown a user interface encouraging them to upload the file to the cloud. For example, upload prompt 410 is generated prompting the user to save the document to cloud storage. In particular, an existing cloud storage service associated with the application or document can be identified as a destination cloud storage location for saving the file. It is contemplated that the upload prompt feature can be associated with a cloud application version or desktop application version of the same application.

At a high level, signals for determining the when a file should be uploaded can be derived from multiple sources (e.g., document and device). Document signals can include file size and whether the file is open is open in read-only or edit mode; and device signals can include location of locally stored and tenant identifier. The unique combination of intrinsic document signals, user behaviors and patterns, and broad understanding patterns from large organizations can be used to make an upload-action-recommendation. In operation, an action-recommendation model can be generated and hosted in the end-user applications. When a user opens a local file and takes enough in-file activity the application will query application business logic to determine if the file is vetoed for upload. If not vetoed, file and user characteristics are passed into the locally hosted model for a prompt/don't prompt decision. If prompt is acceptable, the user is shown UX encouraging them to upload the file. If the user uploads the file, or decides to explicitly decline the upload, characteristics of that file and user are returned to an offline service to further improve updates to that model. Users can decline the prompt by dismissing it explicitly or navigating in the app such that the prompt gets dismissed automatically.

The cloud system provides cloud system operations that generating an upload-action-recommendation. Generating the upload-action-recommendation can be based on collection and processing of telemetry and data. The collected telemetry and data can specifically be used to train an action-recommendation model that supports the cloud system operations. The action-recommendation model supports predicting whether a user intends to upload a file (e.g., document) to the cloud. The action-recommendation model is trained and tuned based on application usage data and cloud usage data associated with uploading files.

The action-recommendation model was generated in part without an existing dialog interface feature (i.e., upload to cloud prompt dialog). Without an existing dialog interface feature, the action-recommendation model is trained without true positive and true negatives for the existing dialogue interface feature. The action-recommendation model is trained with assumed positive and negative cases. For example, the action-recommendation model addresses a binary classification problem for the cloud system operations, as such, positive cases were defined as when a user saved a local file to the cloud. Negative cases were defined as when user saw a dialog (e.g., share, auto-save toggle) but there was not an upload for the session. Initial action-recommendation models were built with assumed labels.

The action-recommendation model was generated based on application usage data and cloud usage data associated with uploading files. The usage data includes signals that are collected from attributes of computing objects in the usage data. For example, a file size can be collected, along with file format and access, which are signals based on the assumed positive and negative labels. In some situations addition verification of the signal was performed. Usage data can further include different tracked interactions with the upload to cloud prompt dialog (e.g., upsell dialog sessions), total number of sessions, total number of open cloud documents, number of times a user performed different actions (e.g., click title bar, shared a document, click insert comment). The usage data can also be tracked for a predefined period of time (e.g., 7 days) and for a current device. It is contemplated that signals can be prioritize based on importance or any other identified criteria.

In operation, data collection for the machine learning include defining positive labels and negative. Samples are collected based on events for user sessions. Samples from the sessions can be combined, based on specific criteria, using relational algebra operators to gain additional insights on the data. Pre-processing operations can be performed on the data set. Data Preprocessing is a technique that is used to convert the raw data into a clean data set. In other words, whenever the data is gathered from different sources it is collected in raw format which is not feasible for the analysis. For example, pre-processing includes transformations applied to the dataset before feeding the dataset to an algorithm. In scenarios where the data may be unbalanced (e.g., positive/negative ratio in dataset) another estimation of the positive negative ratio can be implemented. For example, another estimation could be based on clicks on the upload to cloud prompt dialog ratio.

Generating the upload-action-recommendation can be based on intelligence metrics. Intelligence metrics can be retrieved from services associated with the cloud system. In particular, products and services in cloud may already collect intelligence metrics. As such, the intelligence metrics that measure user activity can be used as additional data for executing cloud system operations include machine learning training operations. Intelligence metrics can support determining the type of user using the cloud system and specifically tracking cloud usage data and upload to cloud prompt dialog usage based on the type of user. For example, a first user type (e.g., addressable user) can be associated with users that have at least a cloud storage account, have an account with a service associated with the cloud system, open a file, have a stored local file.

A second user type (e.g., seen user) can be associated with user who received the upload to cloud prompt dialog. Additional user types include tried user (e.g., user clicks on the button "Upload" of the upload to cloud prompt dialog), kept user (e.g., users who continue the upload flow to completion after clicking "Upload"); and retention user (e.g., kept users of the previous period continue to be kept user of the current period). The user types can be associated with specific telemetry data and usage metrics. For example, usage metrics can include: any session where a file open occurred and the criteria used for addressable users is met; number of impressions shown. The percentage of sessions that were shown at least one prompt. The percentage of client active users who were shown at least one prompt. The percentage of impressions where the user clicked upload; a hit is when the user clicked upload; a miss is when a user did not click upload; An implicit dismiss is when a user closes the prompt by closing the app with the prompt displaying or causing app navigation that removes the prompt. Other combination and variation of intelligence metrics are contemplated for the cloud system operations described herein.

Aspects of the technical solution can be described by way of examples and with reference to FIG. 1A. FIG. 1A illustrates a cloud system 100 having a cloud system engine (server) 10, a cloud system engine (client) 20 and administrator portal 22. The cloud system 100 also includes an action-recommendation models engine 30 and an action-recommendation processor engine 40. The cloud system provides and performs improved cloud system operations and interfaces to support the functionality described with reference to the technical solution and technical solution environment (e.g., FIG. 6, FIG. 7 and FIG. 8).

At step 50, based on user models, client models, application models, and cloud-provide models, action-recommendation profiles are generated. The action-recommendation profiles support generating action-recommendation using scores (e.g., save action score, collaboration action score, upload action score). At step 52, based on cloud system operation, usage data is tracked and communicated for generating action-recommendations. At step 54, based the usage data and an action-recommendation profile, determine that an action-recommendation should be generated. At step 56, based on determining that the action-recommendation should be generated, generate the action recommendation. At step 58, based on generating the action-recommendation, cause generation of an action-recommend interface element associated with action-recommendation. The action-recommendation indicates a prompt for a user to perform or not perform the action-recommendation. At step 60, based on usage data and action-recommendations, update action-recommendation profiles and action-recommendation models.

Functionality of the embodiments of the present invention have further been described, by way of an implementation and anecdotal examples, to demonstrate that the operations for providing action-recommendation operations, based on action-recommendation profiles, are an unconventional ordered combination of operations that operate with a cloud system engine as a solution to a specific problem in cloud systems technology environments to improve computing operations and user interface navigation in cloud systems. Advantageously, the embodiments described herein improve the computing operations, functionality, and the technological process for providing the functionality described herein. Overall, these improvements result in less CPU computation, smaller memory requirements, and increased flexibility in cloud systems.

Figure 1B:
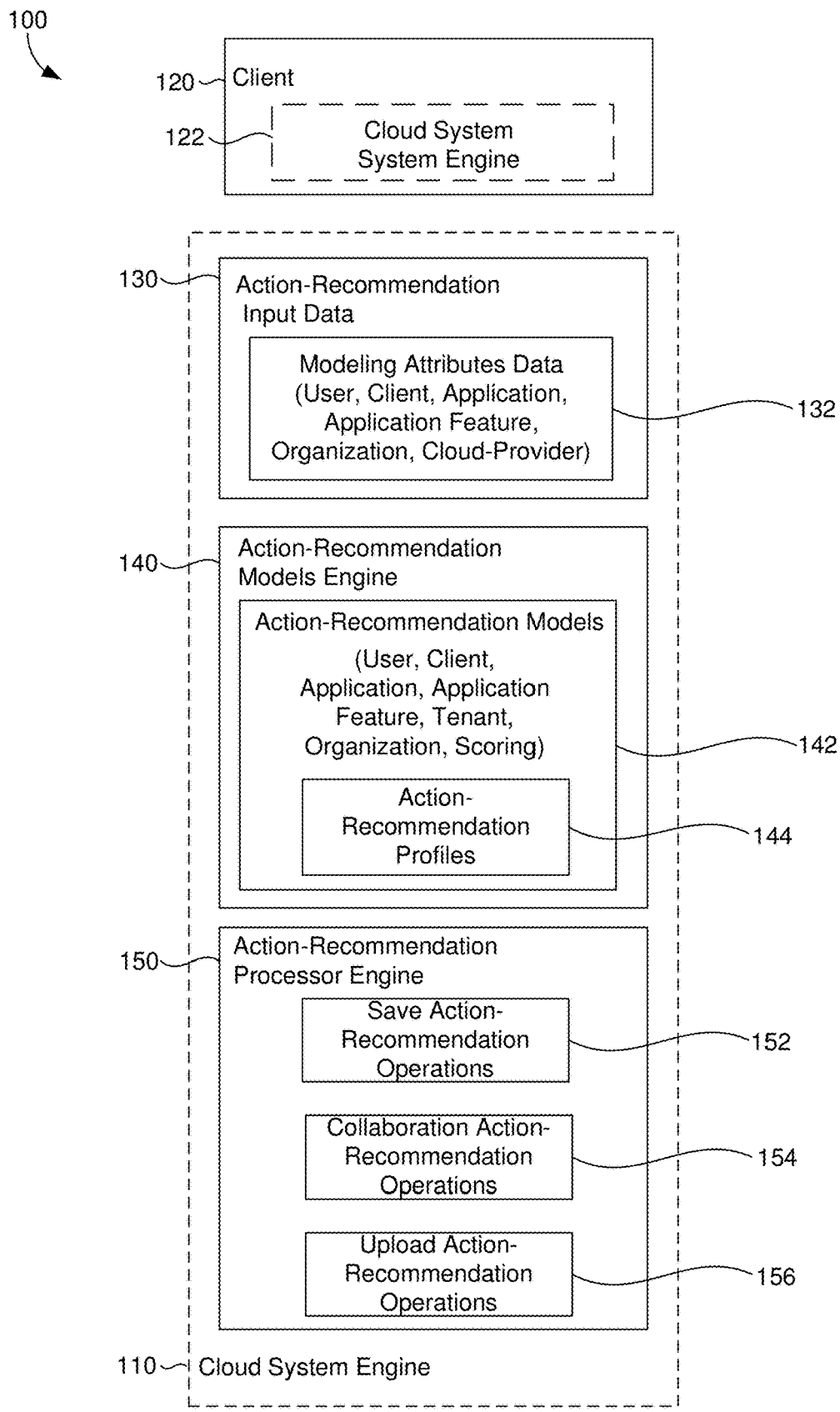

Overview of Example Environments for Providing Cloud System Operations Based on Action-Recommendation Profiles in a Cloud System Turning to FIG. 1B, a block diagram of an exemplary technical solution environment, based on example environments described with reference to FIGS. 6, 7 and 9, for use in implementing embodiments of the technical solution are shown. Generally the technical solution environment includes a technical solution system suitable for providing the example cloud system 100 in which methods of the present disclosure may be employed. In particular, FIG. 2 shows a high level architecture of the cloud system 100 in accordance with implementations of the present disclosure. Among other engines, managers, generators, selectors, or components not shown (collectively referred to herein as "components"), the technical solution environment of cloud system 100 includes a cloud system engine 110, client 120 (including cloud system 122), action-recommendation input data 130 (including modeling attributes data 132), action-recommendation models engine 140 (including action-recommendation models 142, action-recommendation profiles 144), action-recommendation processor engine 150 (including save-action-recommendation operations 152, collaboration-action-recommendation operations 154, and upload-action-recommendation operations).

The components of the cloud system 100 support providing action-recommendation (e.g., save action, collaboration action, upload action) using cloud system operations in a cloud system. In particular, the cloud system includes a cloud system engine (server-side and client-side) that processes, based on action-recommendations models, action-recommendation profiles (e.g., user, client, organization, cloud-provider, and scoring) to generate and communicate action-recommendations to clients. The action-recommendation profile specifically support hybrid cloud actions. Hybrid cloud actions include actions that are associated with traditional productivity tools functionality and the actions now have been extended or interoperate with cloud productivity tools functionality. The action-recommendation profiles are generated based on cloud usage data and action-recommendation data for attributes of cloud system computing objects. Based on the action-recommendation profiles, additional cloud system operations and interfaces associated with action-recommendations can be performed for save actions, collaboration actions, and upload actions.

Figure 5:
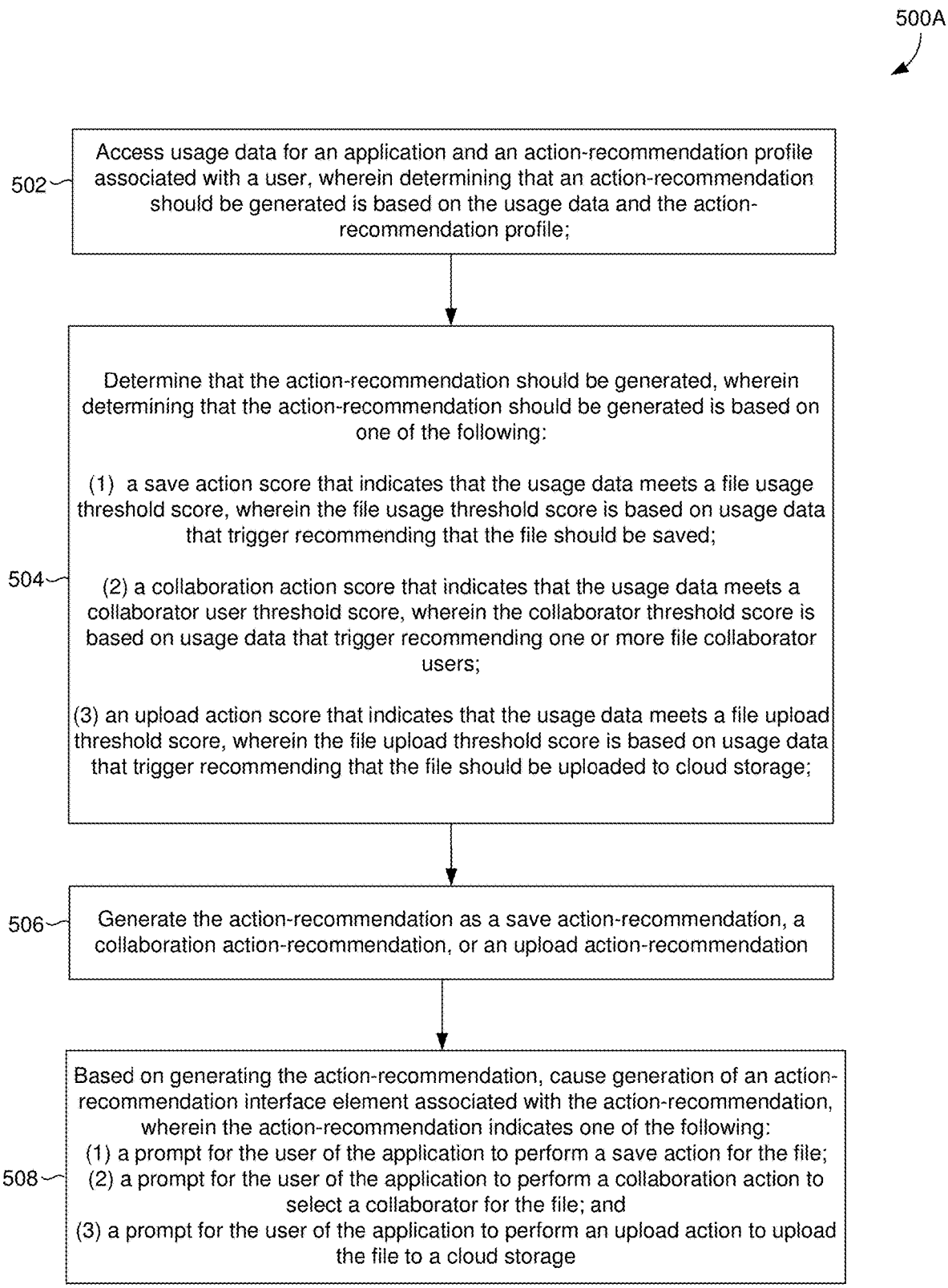
FIG. 5 provides an exemplary method of providing cloud system operations based on action-recommendation profiles in a cloud system, in accordance with aspects of the technology described herein.

Exemplary Methods for Providing Cloud System Operations Based on Action-Recommendation Profiles in a Cloud System With reference to FIG. 5 a flow diagram is provided illustrating methods for cloud system operations based on action-recommendation profiles in a cloud system. The methods may be performed using the search system described herein. In embodiments, one or more computer storage media having computer-executable instructions embodied thereon that, when executed, by one or more processors can cause the one or more processors to perform the methods in the file system.

Turning to FIG. 5, a flow diagram is provided that illustrates a method 500 providing cloud system operations based on action-recommendation profiles in a cloud system. At step 502, access usage data for an application and an action-recommendation profile associated with a user, wherein determining that an action-recommendation should be generated is based on the usage data and the action-recommendation profile. At step 504, determine that the action-recommendation should be generated, wherein determining that the action-recommendation should be generated is based on one of the following: (1) a save action score that indicates that the usage data meets a file usage threshold score, wherein the file usage threshold score is based on the usage data that trigger recommending that the file should be saved;

(2) a collaboration action score that indicates that the usage data meets a collaborator user threshold score, wherein the collaborator threshold score is based the usage data that trigger recommending one or more collaborator users; and (3) an upload action score that indicates that the usage data meets a file upload threshold score, wherein the file upload threshold score is based on usage data that trigger recommending that the file should be uploaded to cloud storage.

At step 506, generate the action-recommendation as a save-action-recommendation, a collaboration-action-recommendation, or an upload-action-recommendation. And at step, 508, based on generating the action-recommendation, cause generation of an action-recommendation interface element associated with the action-recommendation, wherein the action-recommendation indicates one of the following: (1) a prompt for the user of the application to perform a save action for the file; (2) a prompt for the user of the application to perform a collaboration action to select a collaborator for the file; and (3) a prompt for the user of the application to perform an upload action to upload the file to a cloud storage.

Example System Environment

Figure 6:
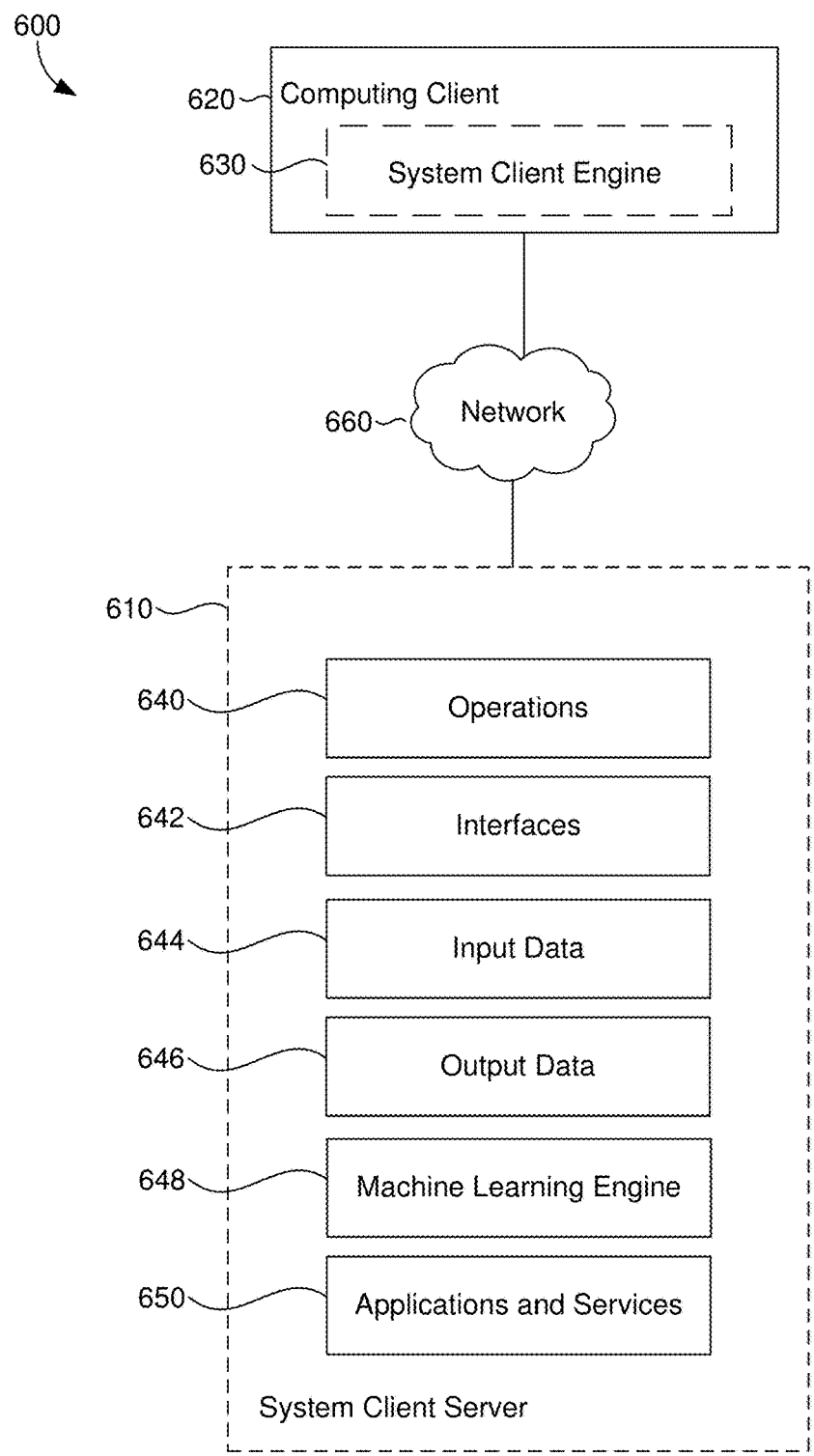
FIG. 6 provides a block diagram of an exemplary system environment suitable for use in implementing aspects of the technology described herein.

With reference to FIG. 6, FIG. 6 illustrates an example system environment 600 in which implementations of the technical solution may be employed. In particular, FIG. 6 include system client server 610 and computing client 620 having a system client engine that can mirror components in the system client server 610. The system client server includes operations 640, interfaces 642, input data 644, output data 646, machine learning engine 648, and application and service 650 that are part of a technical solution environment to support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Example System Environment

Figure 7:
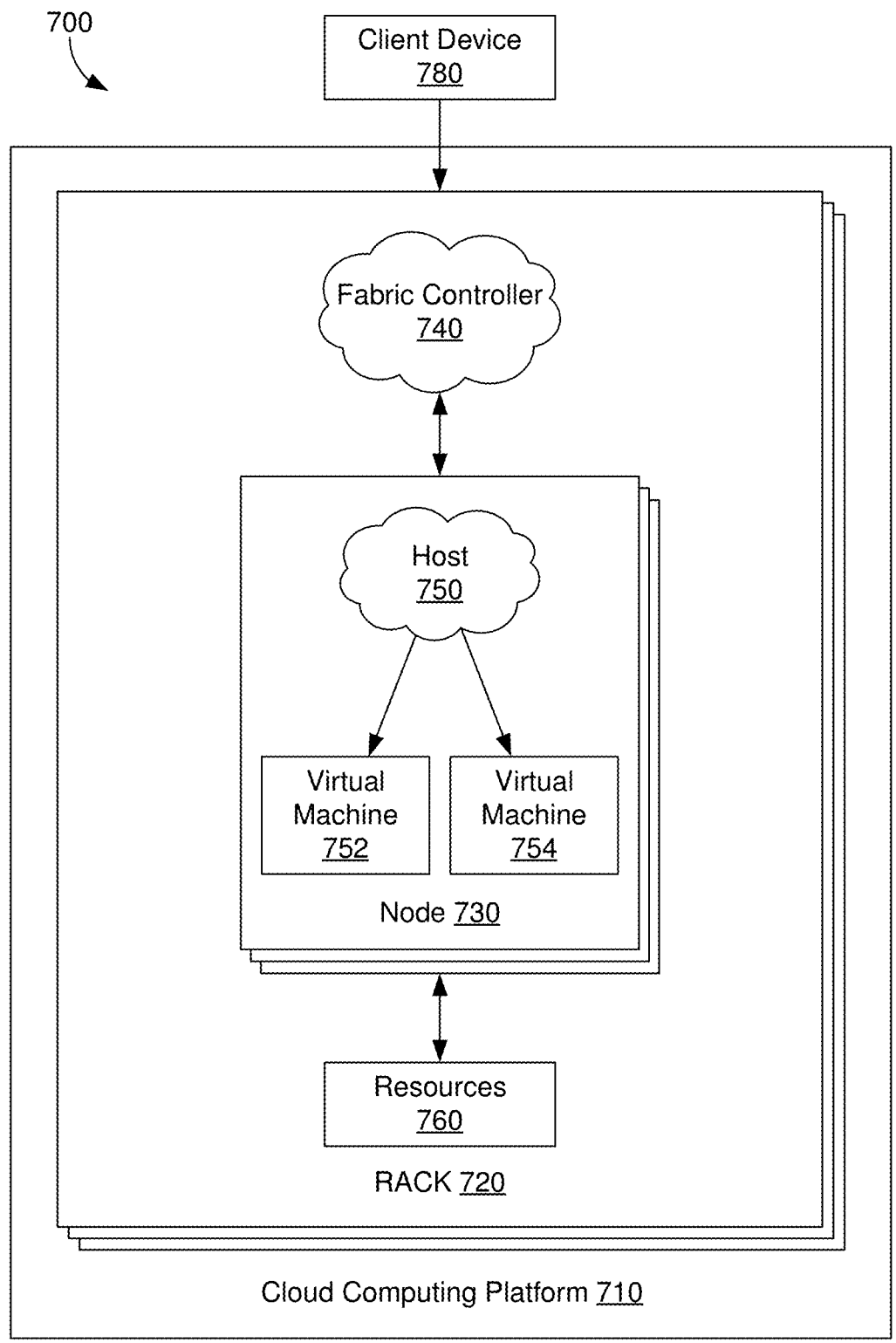
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Distributed Computing Environment

Figure 8:
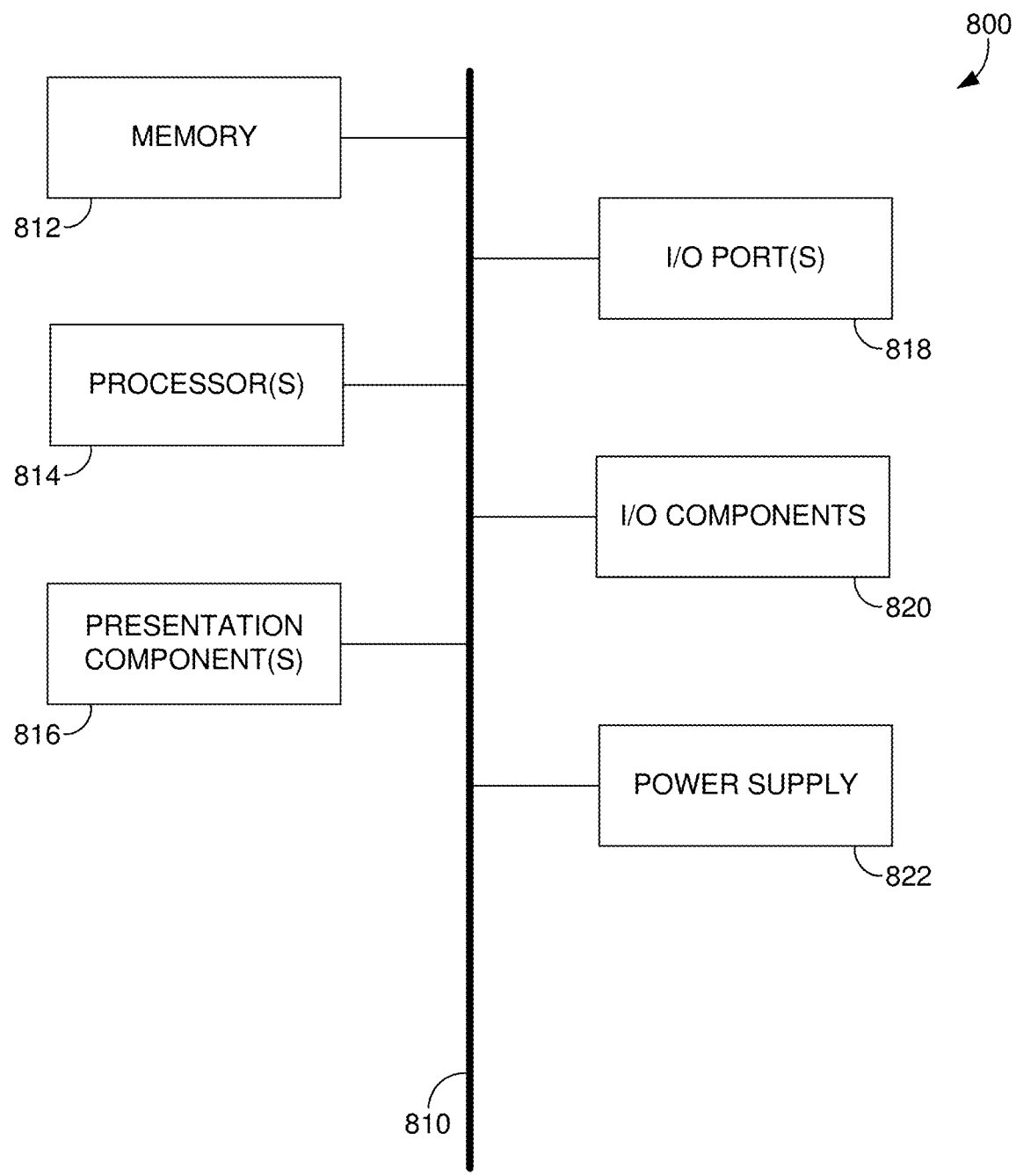
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Embodiment Features and Arrangements

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing usage data of a user, having save attributes, wherein the usage data is for a file associated with an application and an action-recommendation profile associated with the user and the usage data includes a threshold amount of time that has been spent editing the file;
determining, based on the usage data and the action recommendation profile, that an action-recommendation should be generated, wherein:
determining that the action-recommendation should be generated is further based on a determination that the usage data meets a file usage threshold, and the file usage threshold is based on the usage data that triggers recommending that the file should be saved, wherein a save action score indicates that the usage data meets the file usage threshold;
generating the action-recommendation as a save-action-recommendation; and
based on generating the action-recommendation, cause generation, for display to the user, of an action-recommendation interface element associated with the action-recommendation.

2. The system of claim 1, wherein determining that the action-recommendation should be generated is performed by an action-recommendation model operable based on the save attributes, the save attributes being associated with save actions that support predicting when files should be saved, and the action-recommendation model is retrained based on a user selection to perform or not perform the action-recommendation.

3. The system of claim 1, wherein the save attributes are associated with hybrid actions that are defined for both cloud applications and non-cloud applications.

4. The system of claim 3, wherein the usage data includes a threshold amount of data that will be lost if the file is not saved, wherein the threshold amount of data comprises data directly added to the file or other data associated with the file.

5. The system of claim 1, wherein the action-recommendation interface element prompts the user to save the file, wherein the action-recommendation interface element identifies a usage data attribute associated with triggering the action-recommendation.

6. The system of claim 1, the operations further comprising:
based on launching the application, causing download of a cacheable action-recommendation model for action-recommendations;
detecting that the application is operating in an offline mode; and
based on detecting that the application is operating in the offline mode, cause determining that the action-recommendation should be generated.

7. A computerized system comprising:
one or more computer processors; and
computer memory storing computer-useable instructions that, when used by the one or more computer processors, cause the one or more computer processors to perform operations comprising:
accessing usage data of a user, the usage data having collaboration attributes, wherein the usage data is for a file associated with an application and an action-recommendation profile associated with the user;
determining, based on the usage data and the action recommendation profile, that an action-recommendation should be generated, wherein:
determining that the action-recommendation should be generated is further based on a determination that the usage data meets a collaborator user threshold score, and
the collaborator user threshold score is based on the usage data that triggers recommending one or more collaborator users;
generating the action-recommendation as a collaboration action-recommendation comprising the one or more collaborator users; and based on generating the action-recommendation, cause generation, for display to the user, of an action-recommendation interface element associated with the action-recommendation, wherein:

the collaboration attributes are associated with hybrid actions that are defined for both cloud applications and non-cloud application, and the usage data includes a threshold amount of data associated with each of the following: intrinsic document signals, past in-document collaboration signals, and out-of-document user-to-user activity.

8. The system of claim 7, wherein an action-recommendation model is operable based on the collaboration attributes associated with collaboration actions, wherein the collaboration attributes support predicting the one or more collaborator users, wherein the action-recommendation model is retrained based on a user selection to perform or not perform the action-recommendation.

9. The system of claim 7, wherein the usage data is associated with the user and the file at a creation time of the file, and the usage data supports identifying collaborators based on past signals and current-document signals.

10. The system of claim 7, the operations further comprising: performing both asynchronous processing and synchronous processing for generating the action-recommendation, wherein the asynchronous processing generates and updates a feature set comprising one or more user-document-neighbor triplets, and wherein synchronous processing is based on the feature set.

11. The system of claim 10, wherein the one or more user-document-neighbor triplets are labeled with a plurality of the labels that are supported in a feature-engineering model of the feature set.

12. A computerized system comprising:

one or more computer processors; and computer memory storing computer-useable instructions that, when used by the one or more computer processors, cause the one or more computer processors to perform operations comprising:

accessing usage data of a user, having upload attributes, the usage data is for a file associated with an application and an action-recommendation profile associated with a user and the usage data includes a threshold amount of time that has been spent editing the file;

determining, based the usage data and the action recommendation profile, that an action-recommendation should be generated, wherein:

determining that the action-recommendation should be generated is further based on a determination that the usage data meets a file upload threshold score, and the file upload threshold score is based on the usage data that triggers recommending that the file should be uploaded to cloud storage;

generating the action-recommendation as an upload-action-recommendation; and based on generating the action-recommendation, cause generation, for display to the user, of an action-recommendation interface element associated with the action-recommendation.

13. The system of claim 12, wherein determining that the action-recommendation should be generated is performed by an action-recommendation model operable based on save attributes, the save attributes being associated with save actions that support predicting when files should be saved, and the action-recommendation model is retrained based on a user selection to perform or not perform the action-recommendation.

14. The system of claim 12, wherein the upload attributes are associated with hybrid actions that are defined for both cloud applications and non-cloud application.

15. The system of claim 12, wherein the usage data is determined for user-document pairs, and documents are associated with vetoes that are non-pattern logic that indicate whether a file should be uploaded to the cloud storage.

16. The system of claim 12, wherein the usage data is tracked differently for different users of the cloud applications, and users associated with a plurality of cloud application services are tracked across each of the plurality of cloud applications services.

17. The system of claim 12, wherein the action-recommendation interface element further comprises instructional information identifying a reason for providing action-recommendation.

* * * * *